July 24, 1934.  A. C. HARDY  1,967,239
METHOD OF AND MEANS FOR PRODUCING MUSICAL TONES
Filed March 14, 1931   18 Sheets-Sheet 1
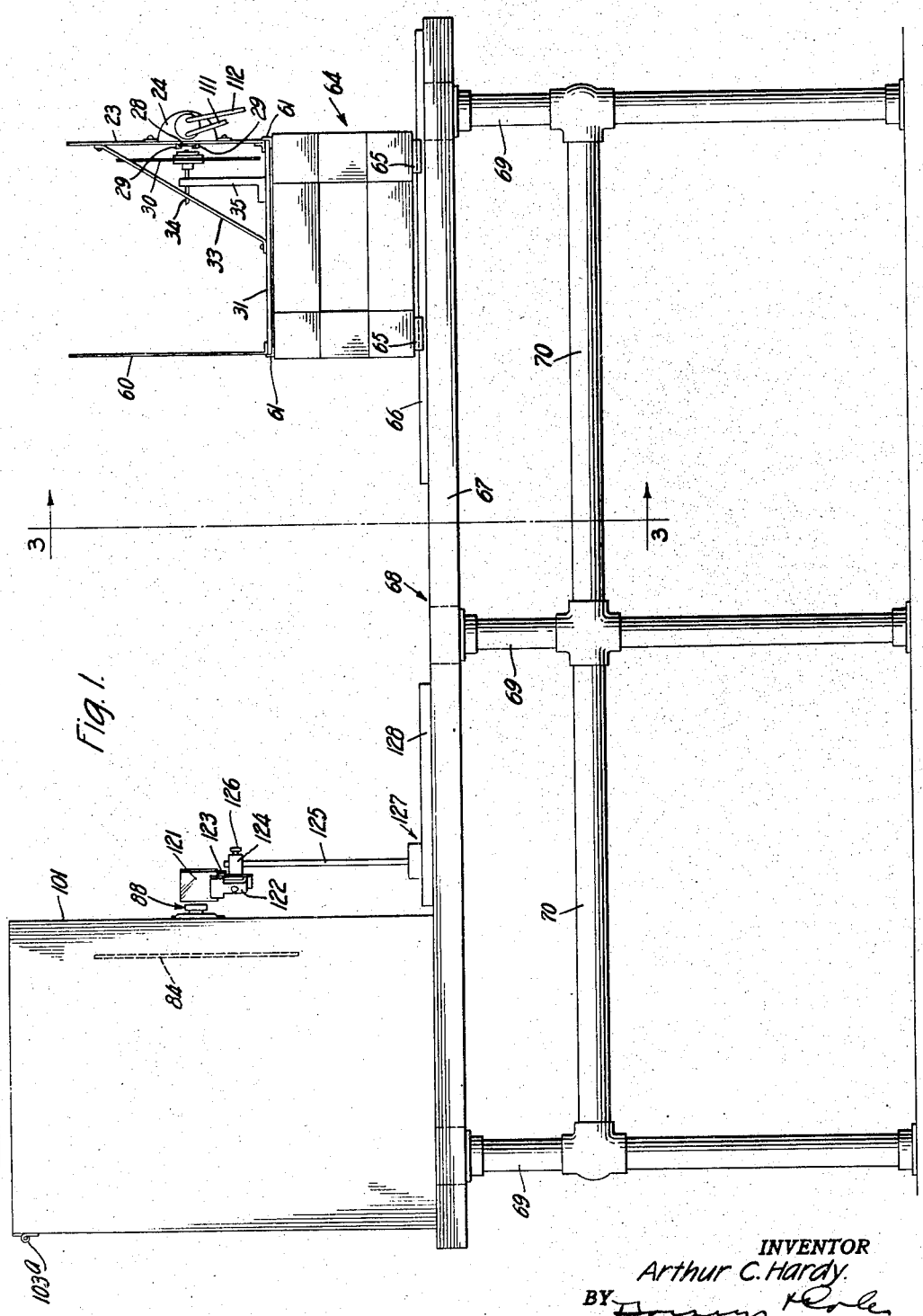
INVENTOR
Arthur C. Hardy.
BY
ATTORNEYS

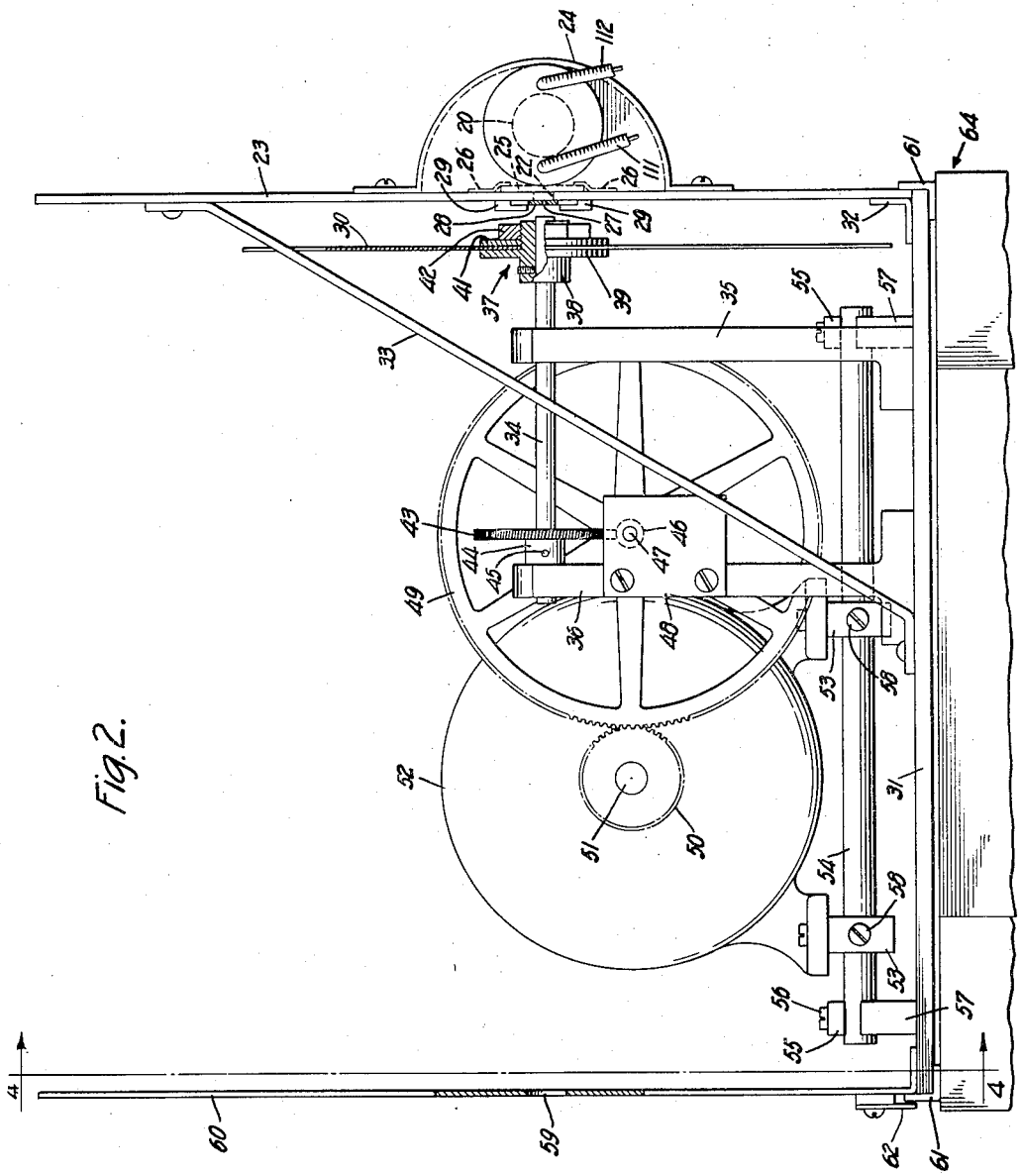

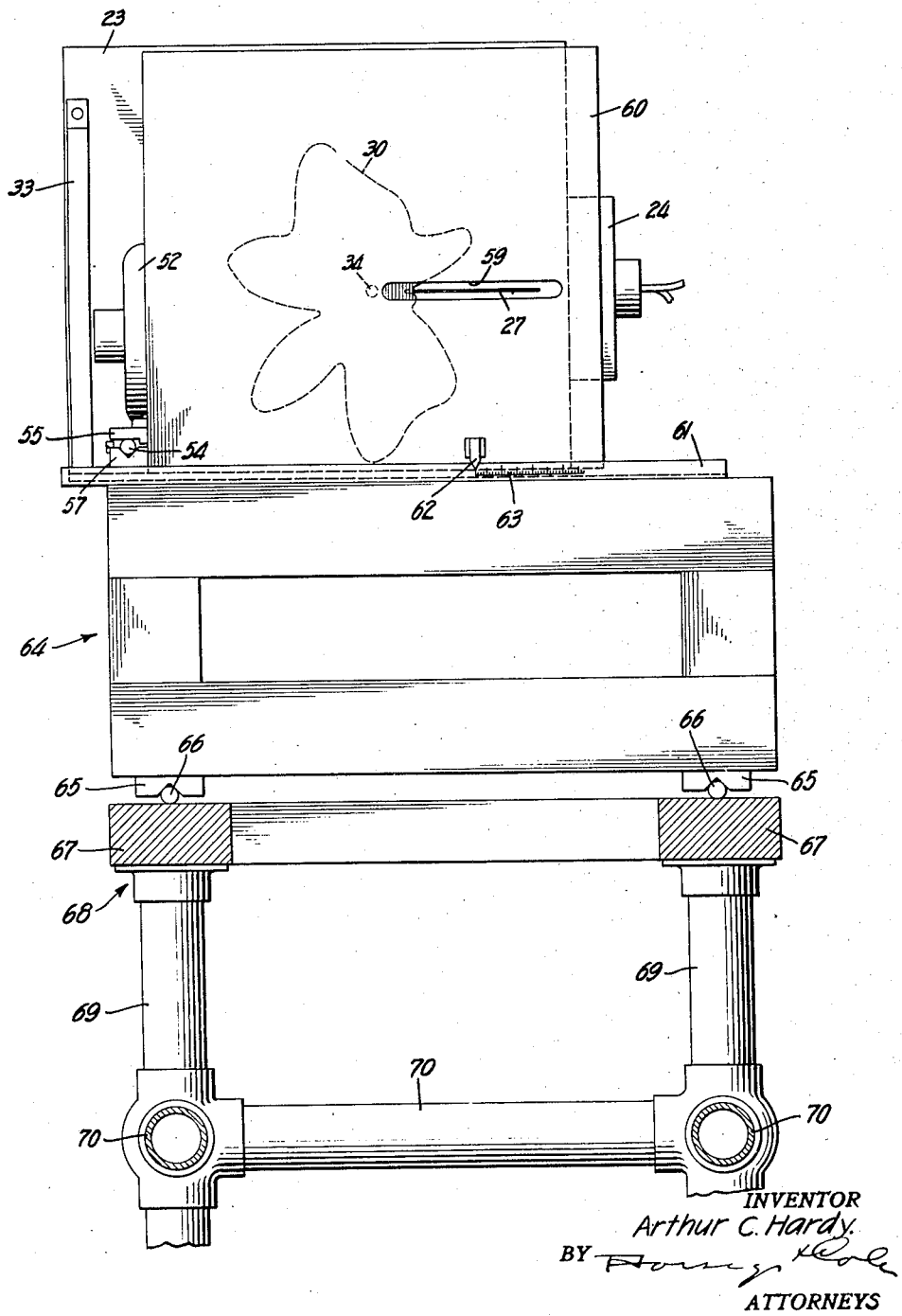

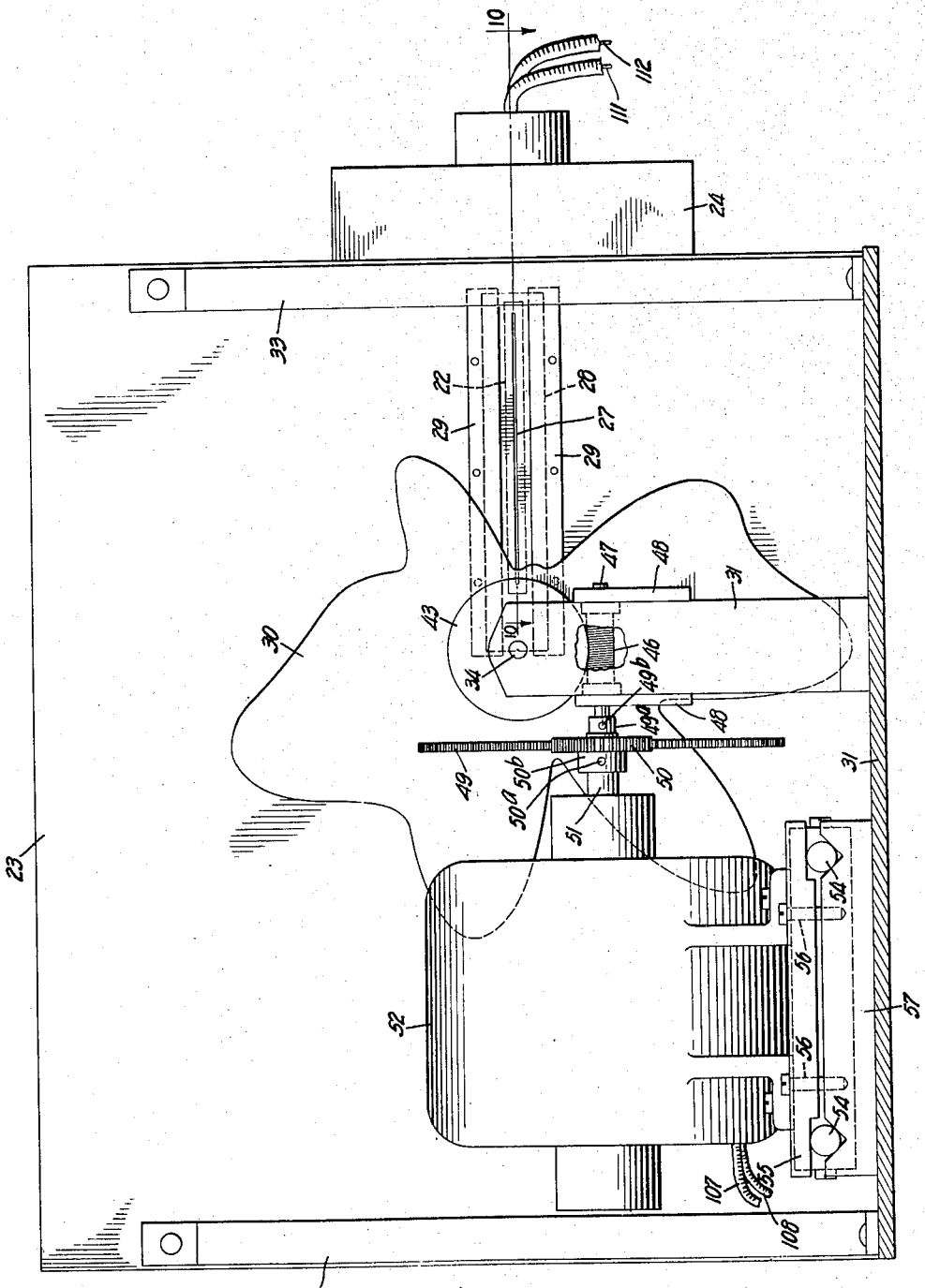

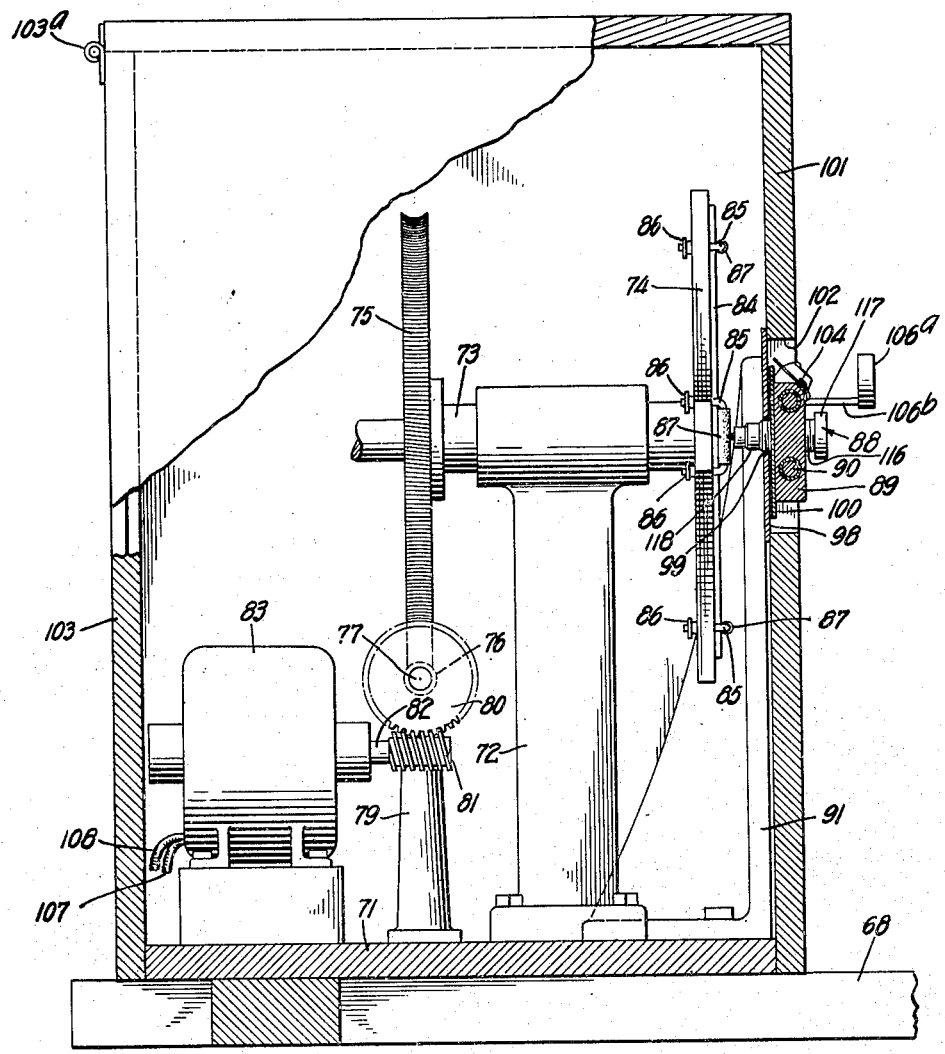
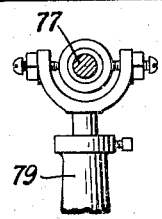

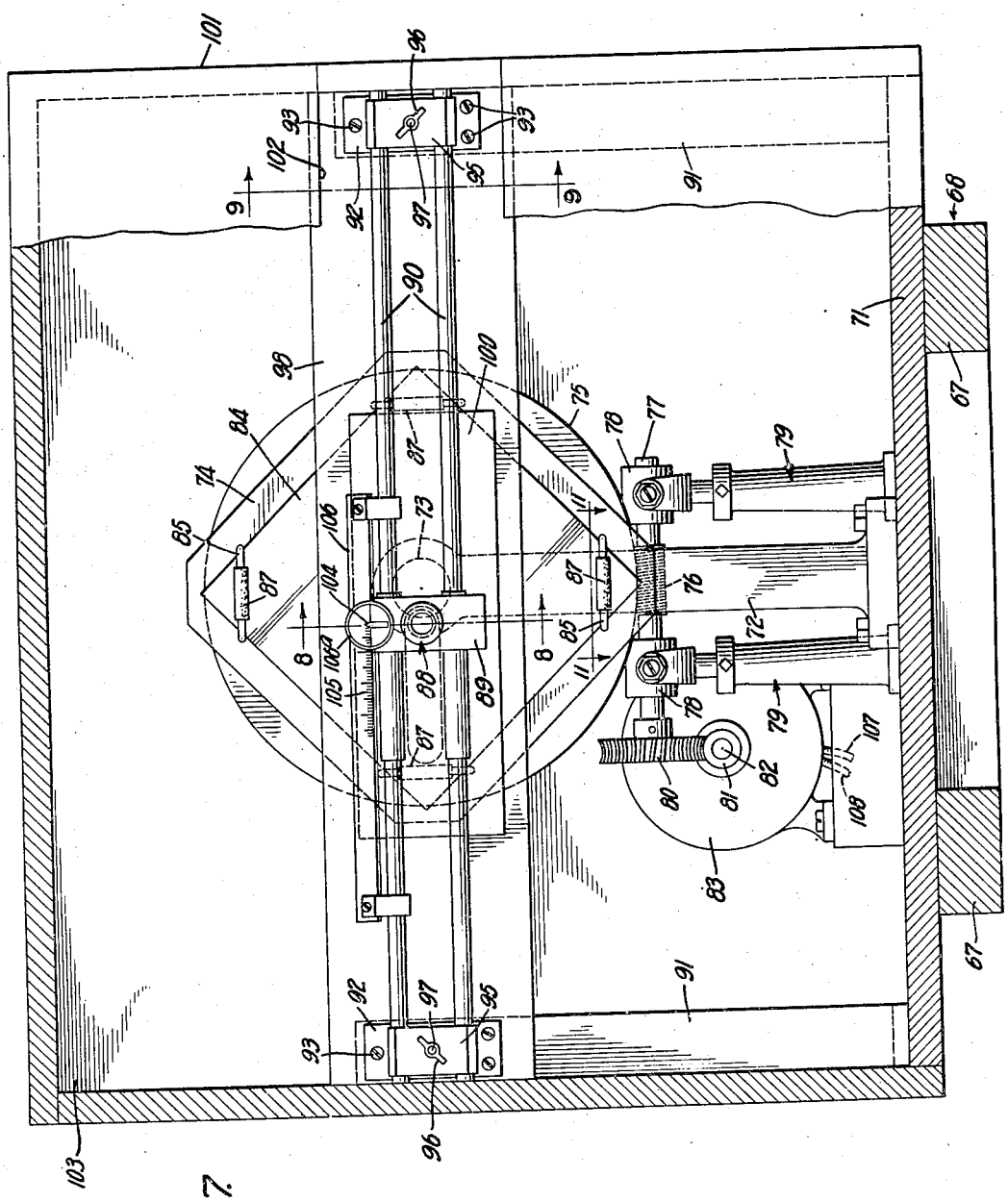

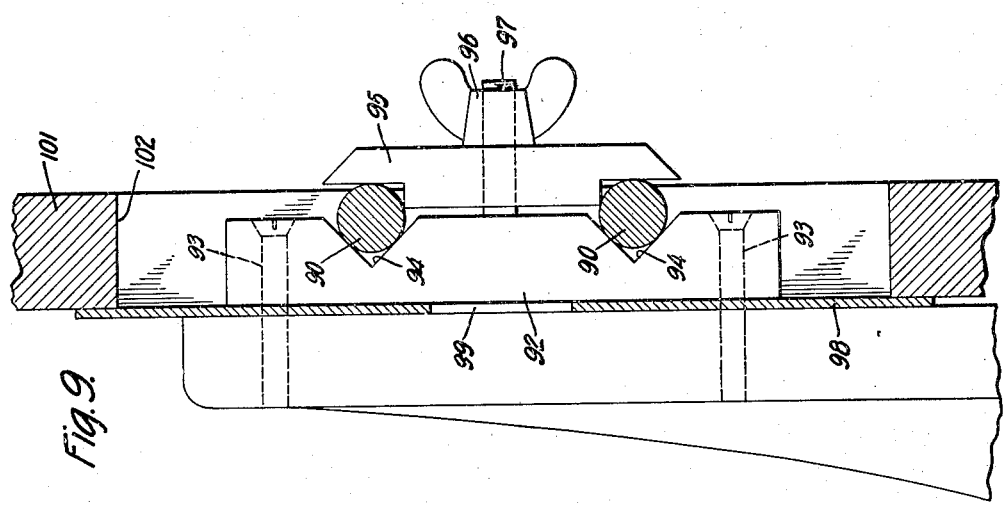
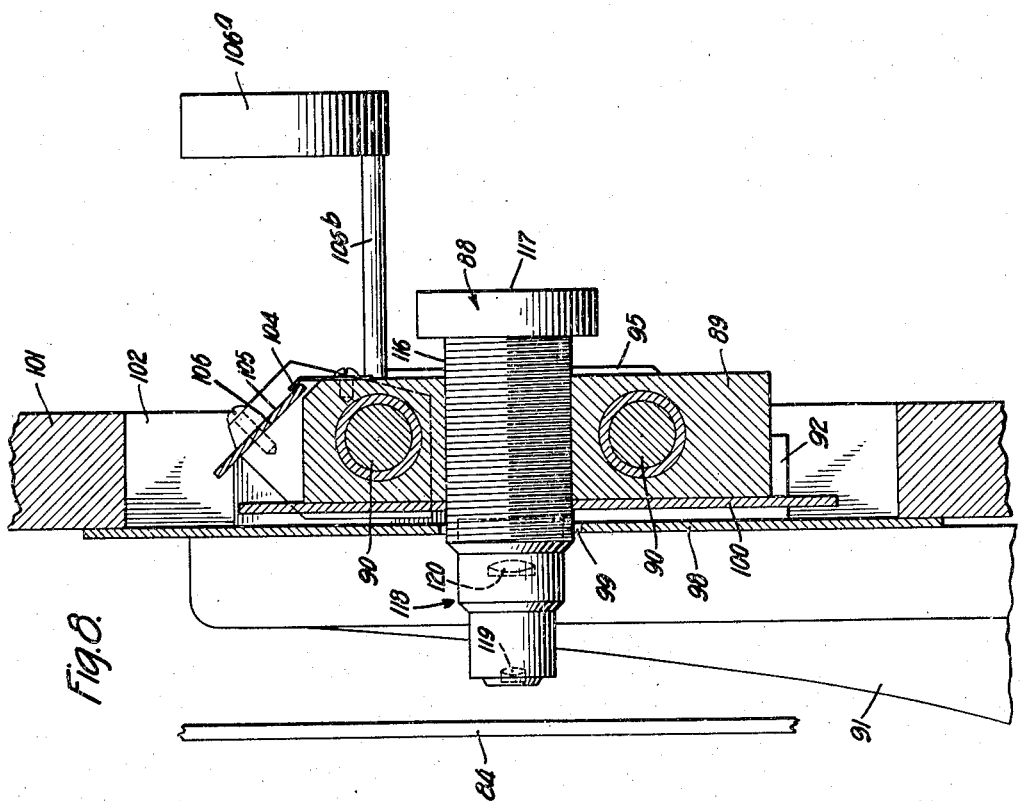

July 24, 1934.  A. C. HARDY  1,967,239
METHOD OF AND MEANS FOR PRODUCING MUSICAL TONES
Filed March 14, 1931  18 Sheets-Sheet 8
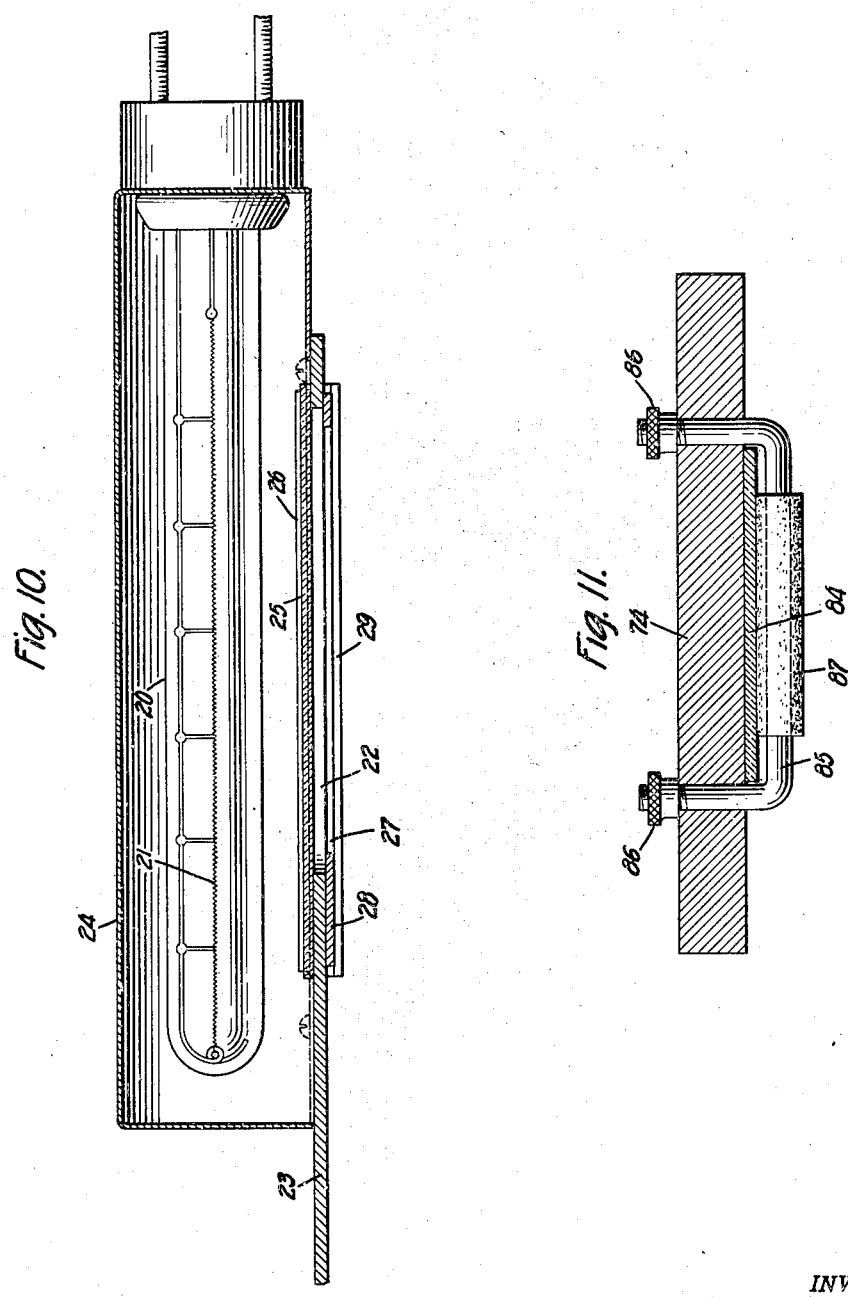
INVENTOR
Arthur C. Hardy.
BY
ATTORNEYS July 24, 1934.   A. C. HARDY   1,967,239
METHOD OF AND MEANS FOR PRODUCING MUSICAL TONES
Filed March 14, 1931   18 Sheets-Sheet 9

INVENTOR
Arthur C. Hardy.
BY
ATTORNEYS

July 24, 1934.  A. C. HARDY  1,967,239
METHOD OF AND MEANS FOR PRODUCING MUSICAL TONES
Filed March 14, 1931   18 Sheets-Sheet 10
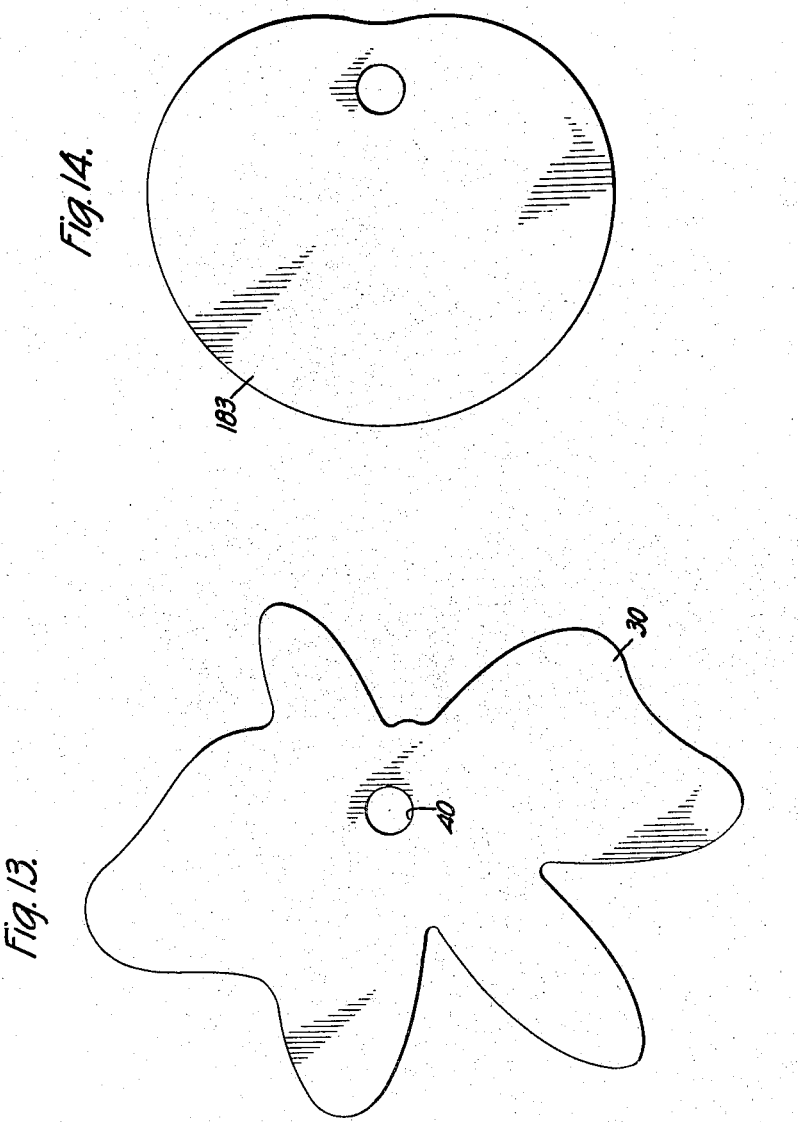
INVENTOR
Arthur C. Hardy.
BY
ATTORNEYS July 24, 1934.  A. C. HARDY  1,967,239
METHOD OF AND MEANS FOR PRODUCING MUSICAL TONES
Filed March 14, 1931   18 Sheets-Sheet 11

INVENTOR
Arthur C. Hardy
BY
ATTORNEYS

July 24, 1934.  A. C. HARDY  1,967,239
METHOD OF AND MEANS FOR PRODUCING MUSICAL TONES
Filed March 14, 1931   18 Sheets-Sheet 12

INVENTOR
Arthur C. Hardy.
BY
ATTORNEYS

July 24, 1934.  A. C. HARDY  1,967,239
METHOD OF AND MEANS FOR PRODUCING MUSICAL TONES
Filed March 14, 1931    18 Sheets-Sheet 13

INVENTOR
Arthur C. Hardy.
BY
ATTORNEYS

July 24, 1934.  A. C. HARDY  1,967,239
METHOD OF AND MEANS FOR PRODUCING MUSICAL TONES
Filed March 14, 1931  18 Sheets-Sheet 14
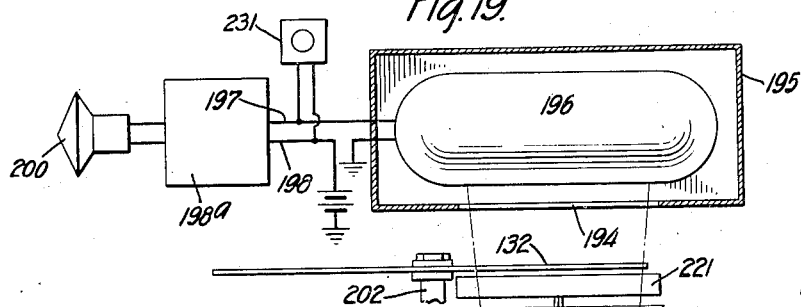
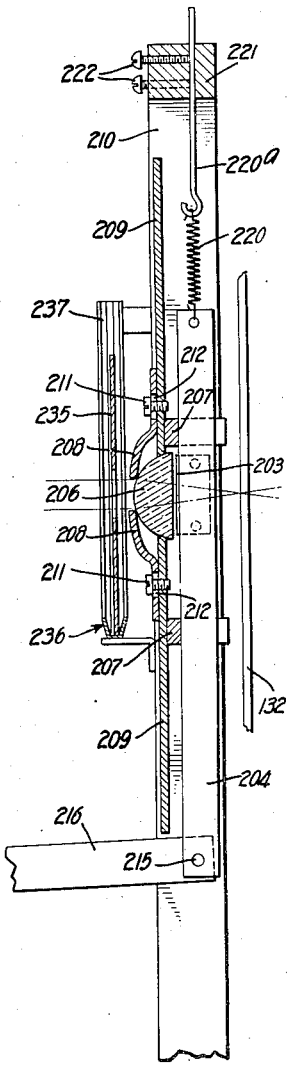
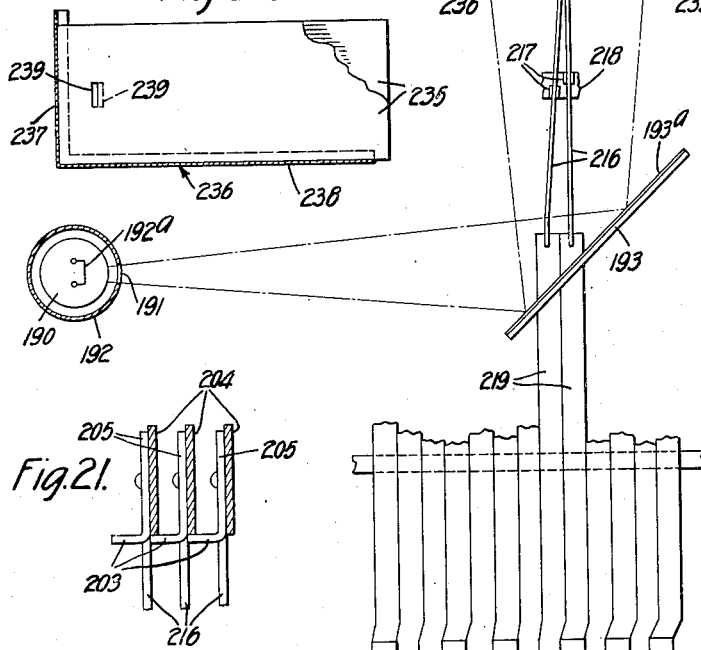
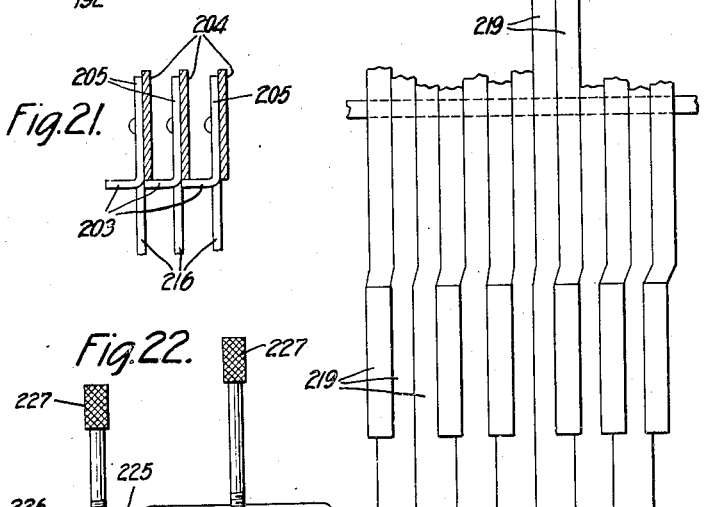
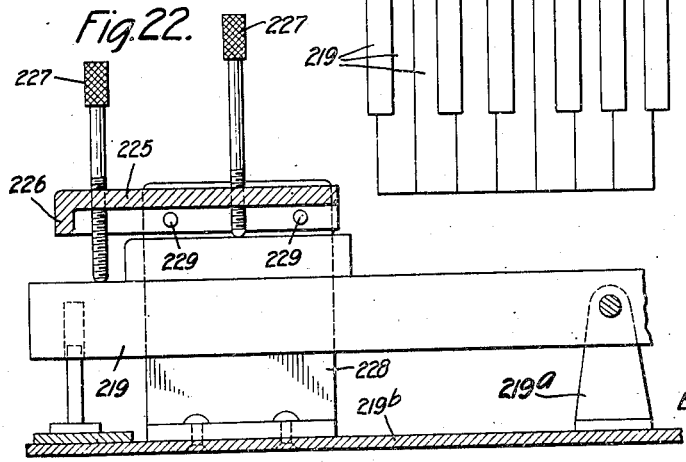
INVENTOR
Arthur C. Hardy.
BY
ATTORNEYS

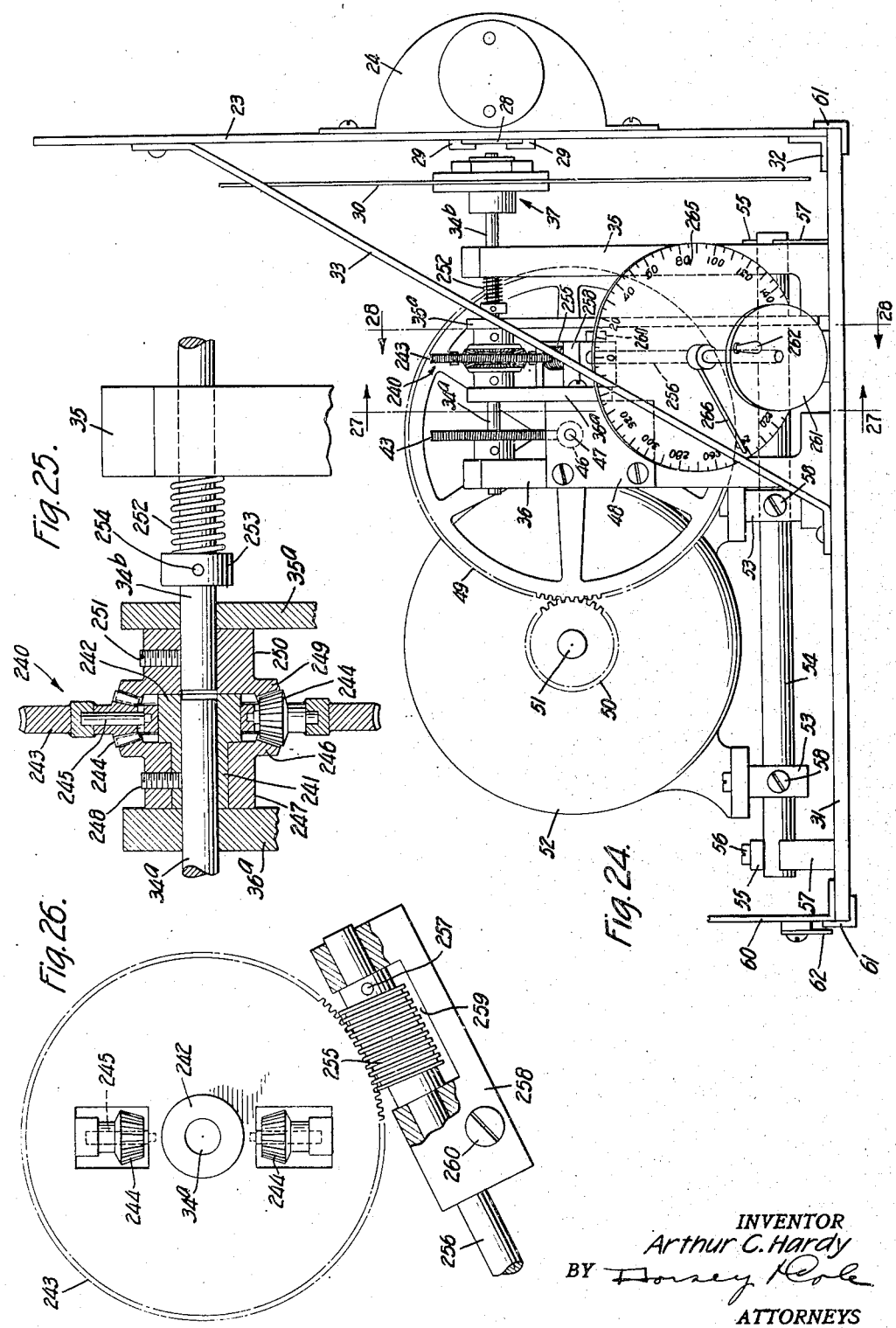

July 24, 1934.   A. C. HARDY   1,967,239
METHOD OF AND MEANS FOR PRODUCING MUSICAL TONES
Filed March 14, 1931   18 Sheets-Sheet 16
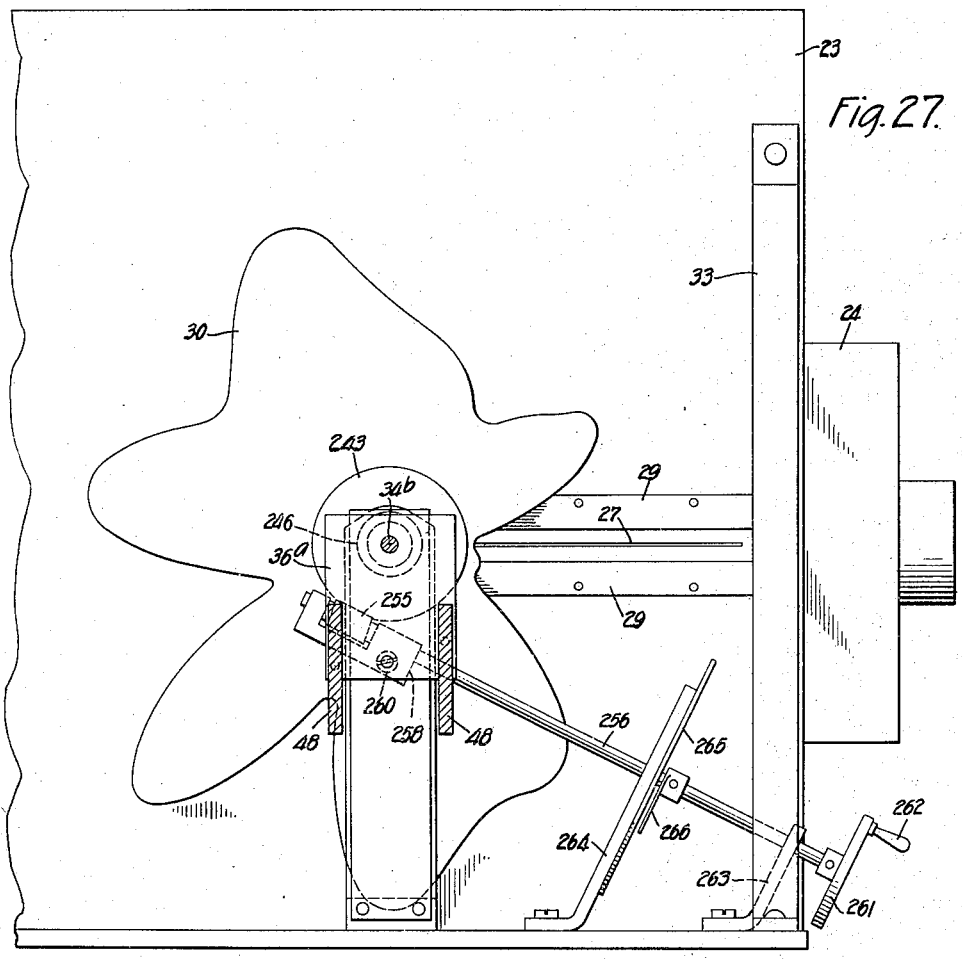
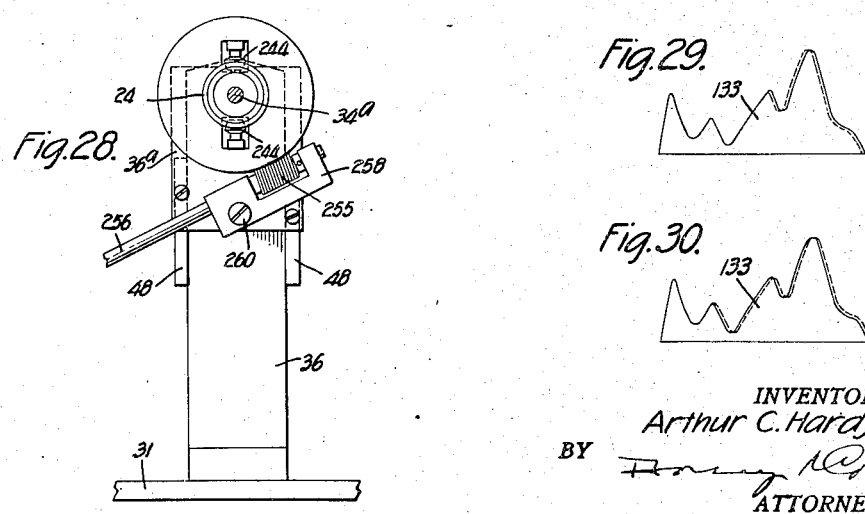
INVENTOR
Arthur C. Hardy.
BY
ATTORNEYS July 24, 1934.  A. C. HARDY  1,967,239
METHOD OF AND MEANS FOR PRODUCING MUSICAL TONES
Filed March 14, 1931   18 Sheets-Sheet 17

INVENTOR
Arthur C. Hardy.
BY
ATTORNEYS

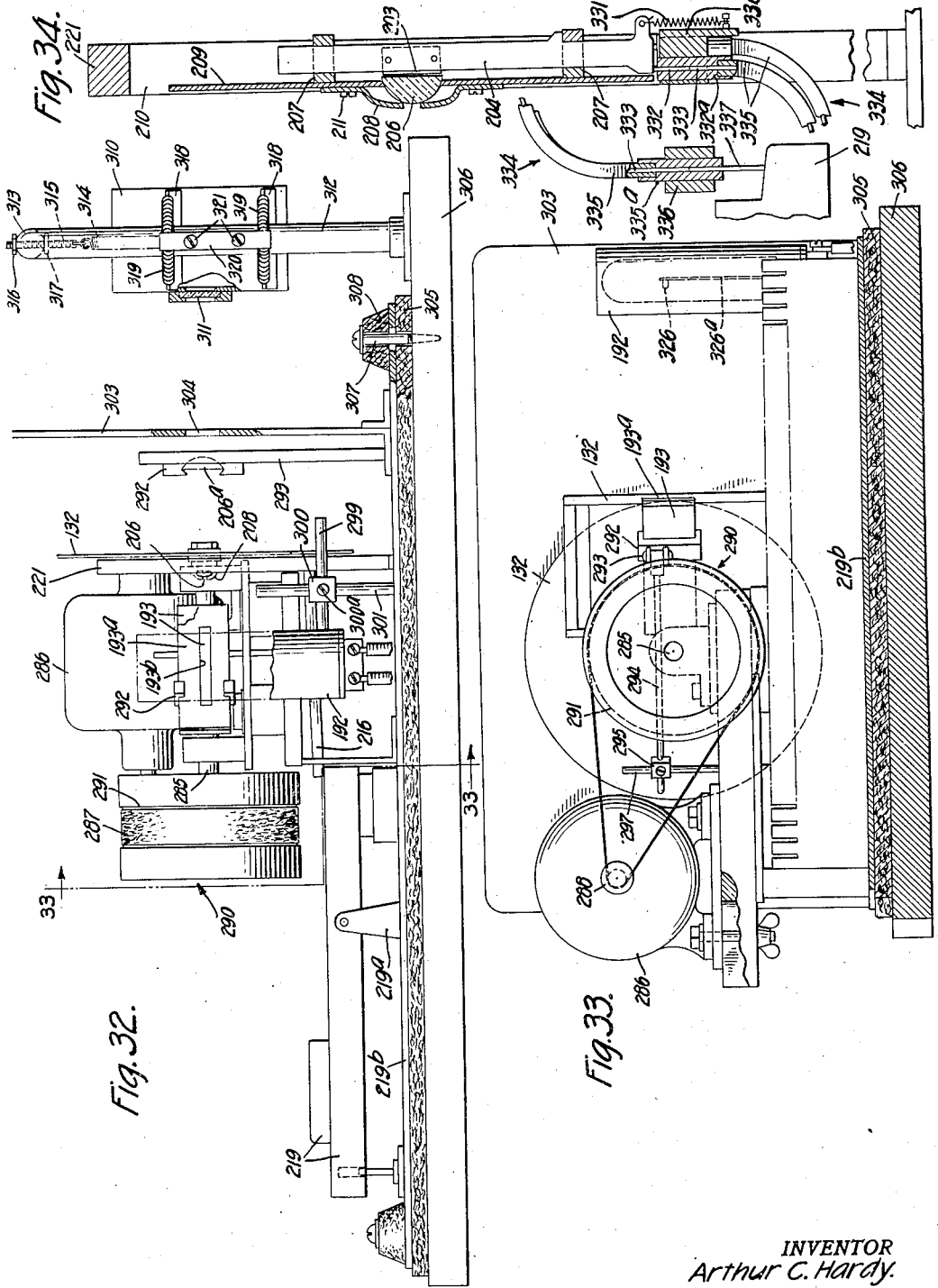

Patented July 24, 1934

1,967,239

UNITED STATES PATENT OFFICE 1,967,239

METHOD OF AND MEANS FOR PRODUCING MUSICAL TONES

Arthur Cobb Hardy, Wellesley, Mass., assignor to du Val R. Goldthwaite, New York, N. Y.

Application March 14, 1931, Serial No. 522,726

54 Claims. (Cl. 84—1)

This invention relates to methods of and means for producing musical tones selectively at the will of the operator by converting light variations into electrical variations and finally into sound, and is in the nature of an improvement of the invention disclosed in the copending application of du Val R. Goldthwaite, Sr. No. 305,964, filed September 14, 1928.

In general the prduction of musical tones in this way involves relative movement between a sound-controlling record comprised of individual light-controlling patterns or graphs and a source of light in such a manner as to cause light variations. Through the use of a light-sensitive device, such as a photo-electric or selenium cell in combination with a suitable amplifier and loudspeaker, the light variations are converted into electrical variations and then into sound. Shutters or contact points, operated manually from a keyboard, are usually provided so that light may be allowed to fall on the individual patterns selectively at the will of the operator. Suitable means may be provided to make the operation automatic rather than manual. The sound-controlling record may be made photographically, and the individual light-controlling graphs, which may be of the variable width or variable density type, usually represent tones which have the pitch relationship of the notes in a musical scale.

The production of pleasing musical tones in this manner necessitates the solution of many problems, some of which involve important optical and speed-control considerations. Aside from the Goldthwaite application above identified the prior art is very meagre and for the most part consists of ideas impossible of accomplishment in a satisfactory manner with the means heretofore suggested. The present application is based on a study and solution of the various problems involved in the actual development, construction and testing of recording and playing apparatus, and likewise, of sound-controlling records, resulting in perfection of tone quality over a wide range of tone production.

Inasmuch as the quality of the tones produced by such an instrument largely depends on the character of the individual patterns or graphs on the sound-controlling record, the method of making the records is of extreme importance.

With the exception of the above mentioned copending application, the methods of making the sound-controlling record suggested by the prior art involve converting electrical variations into light variations and recording the light variations on a light-sensitive surface in the form of individual light-controlling patterns or graphs of the variable width or variable density type. These methods contemplate that the electrical variations are to be initiated either by sound waves, produced for example by playing a note on a musical instrument, which impinge on a microphone connected in circuit with an amplifier and a recording light-valve or galvanometer, or else they are to be caused directly by the use of current-varying instrumentalities such as alternating current generators or vacuum tubes. Both of these methods require complicated apparatus and have other disadvantages, one of the most serious of which is common to all such systems—namely, the electrical and optical characteristics of all presently available electrical recording and reproducing apparatus for carrying out these methods introduce distortion.

One of the objects of this invention is to produce selectively musical tones of the desired quality, free from objectionable pitch variations and with any desired pitch relationship.

Important features of the present invention are the method of and means for making a sound-controlling record adapted to control the production of tones which are related to each other in pitch as the notes of the tempered scale. Since most music is written in the tempered scale, the disclosure, therefore, in this regard constitutes a valuable contribution to the art of making records for electrical musical instruments of the siren type regardless of the principle of current variation which the instrument utilizes.

This invention also has as one of its objects an improved instrument for the playing of sound-controlling records of the general character herein set forth.

Other important features of the present invention are novel methods of and means for making sound-controlling records of the type required by photo-electric musical instruments of this character by scanning a primary wave-form pattern with a line of light and utilizing the resultant light variations to control the recording of wave-forms on a light-sensitive blank; for determining and making the primary patterns; for determining the position of a wave-form on the blank; for varying the wave-form; for regulating the degree of exposure of the light-sensitive blank; for forming a scanning light image on the sound-controlling record without use of a mechanical slit; for regulating the volume of sound emitted by the playing instrument; and for building up composite tones of desired quality.

Additional features and advantages will appear upon consideration of the following description and drawings, in which:—

Fig. 1 is a side elevation of one form of recording apparatus;

Fig. 2 is a view on a larger scale of the structure shown at the right on Fig. 1, certain parts being omitted for the sake of simplicity;

Fig. 3 is a sectional view taken on the line 3—3 of Fig. 1;

Fig. 4 is a section taken along the line 4—4 of Fig. 2;

Fig. 5 is an elevation, on a larger scale, of the structure at the left end of Fig. 1, the side of the casing being broken away to show the mechanism at the interior of the casing;

Fig. 6 is a view of the upper end of a shaft support of which the lower end appears on Fig. 5;

Fig. 7 is a view of the structure of Fig. 5 as seen from the right and with the casing broken away to show the interior structure;

Fig. 8 is a sectional view taken along the line 8—8 of Fig. 7;

Fig. 9 is a sectional view taken along the line 9—9 of Fig. 7;

Fig. 10 is a horizontal section of the single filament lamp, its casing and the support therefore;

Fig. 11 is a sectional view illustrating the manner in which a corner of the sensitized blank is secured to the rotatable support;

Fig. 13 is a view of a primary pattern for recording a composite wave;

Fig. 14 is a view of a primary pattern for recording a sine wave;

Fig. 19 is a fragmentary diagrammatic view of playing apparatus showing general relationship of important parts;

Fig. 20 is a vertical sectional view illustrating the shutters and parts associated therewith;

Fig. 21 is a horizontal section taken at a position just above the shutters and illustrating their connection with the upright members on which they are mounted;

Fig. 22 is a fragmentary side view illustrating means for adjustably depressing the keys in connection with the use of a harmonizer record;

Fig. 23 is a view illustrating a card guide and two apertured cards each for use in shutting off light from all but one shutter-controlled space at a time;

Fig. 24 is a view similar to Fig. 2 of a modified form of the apparatus;

Fig. 25 is a fragmentary view illustrating in section the construction of the differential shown in Fig. 24;

Fig. 26 is a fragmentary view illustrating the means for controlling the central part of the differential;

Fig. 27 is a section taken along the line 27—27 of Fig. 24;

Fig. 28 is a section taken along the line 28—28 of Fig. 24;

Fig. 29 is a view illustrating the shortening of the waves of a graph;

Fig. 30 is a view illustrating the lengthening of the waves of a graph;

Fig. 32 is a side elevation of structure shown in Fig. 31;

Fig. 33 is a section taken along the line 33—33 of Fig. 32; and

Fig. 34 is a fragmentary view, partly in section, illustrating a modified form of shutter-controlling means.

Figure 12:
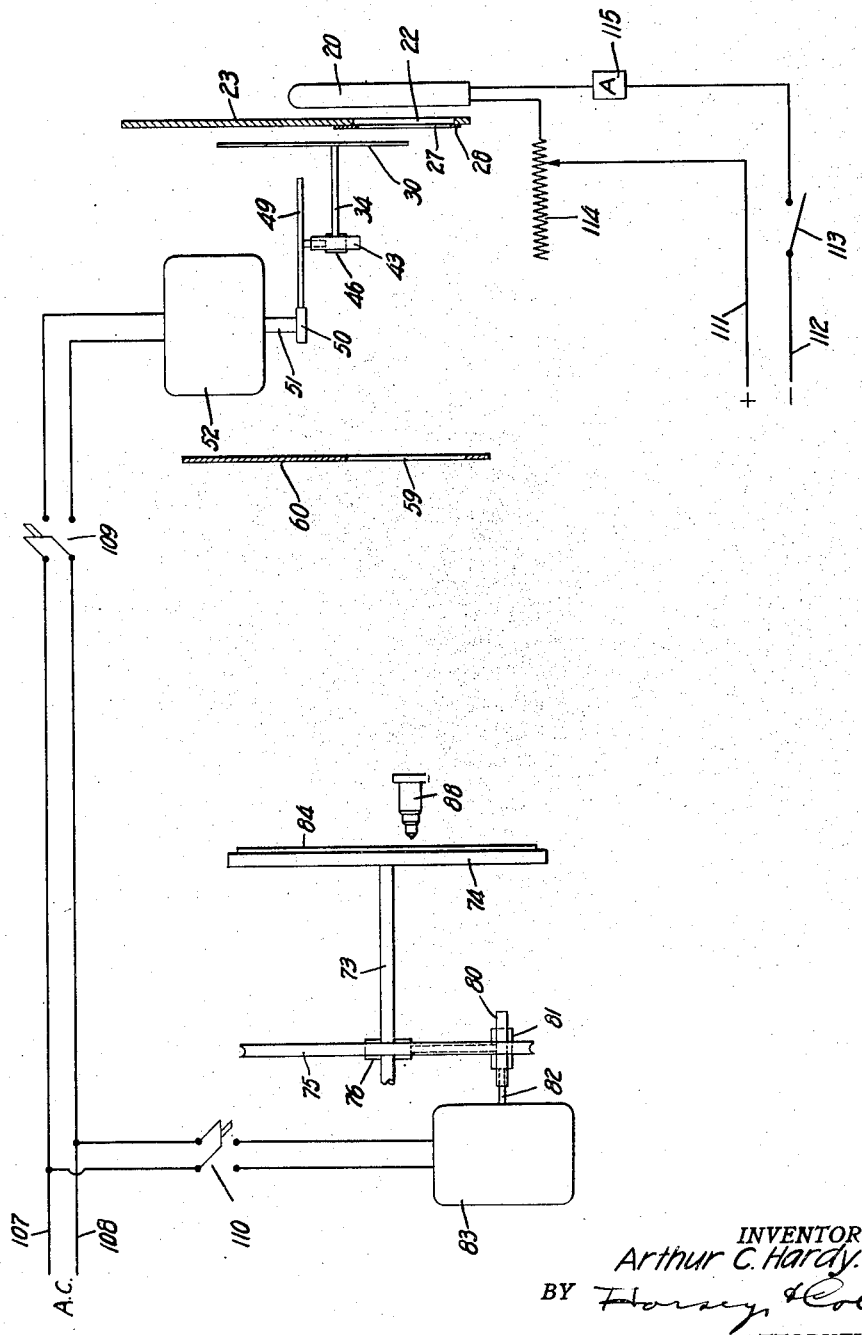
Fig. 12 is a diagrammatic view illustrating the relation between the various parts of the apparatus.

To facilitate a clear understanding of the methods of and means for producing musical tones as contemplated by this invention, it is desirable to describe in order the broad method of making a sound-controlling record; one satisfactory form of recording apparatus utilizing a primary pattern of the disk type; a method of operating the recording apparatus in the production of a sound-controlling record of the variable width type and a description of such record; one form of apparatus suitable for playing the sound-controlling records; method of and means for synthesizing partials to build up a composite tone of desired quality preparatory to making primary pattern; modified form of recording apparatus suitable for making phase shifts during the recording process and adapted for use in making a tempered scale sound-controlling record; primary patterns—their form, material and method of construction; a modified form of playing apparatus; and the optical and speed control considerations involved in producing tones of desired quality free from objectionable pitch variations.

*Broad method of making sound-controlling records*

In its broad aspect the method of making a sound-controlling record comprises effecting relative movement between a primary pattern and a line or aperture of light in such a manner as to intercept the light and vary it directly. The light variations so caused may be either directly recorded photographically on a light-sensitive blank as individual graphs of the variable density or variable width type adapted to control the production of tones of desired quality and pitch, or may be utilized to control indirectly the recording of desired wave forms.

*A form of apparatus for making a sound-controlling record utilizing a primary pattern of the disk type*

The means and method disclosed and covered by many of the claims herein are adapted for use in the making of sound-controlling records of both the variable width and variable density type of graph. I have chosen for illustrative purposes the variable width type but without intended limitation on the scope of this patent.

I have further chosen for illustrative purposes, and without intended limitation hereof, a light-controlling sound record of the plate or disk type comprising a series of individual concentric, continuous wave-form patterns or graphs each individual graph comprising a plurality of identical wave forms, and representative of tones of different pitch as desired, and the method of recording whereby the light variations caused by scanning the primary pattern are directly recorded on the light-sensitive blank.

Referring then more particularly to a light-controlling sound record comprising variable width graphs and in the form of a disk, in one satisfactory form of recording apparatus, a line of light suitable for scanning the primary pattern is produced by use of a lamp 20 as shown in Fig. 10 having a single filament 21 and supported with its filament substantially parallel to an elongated aperture, such as a slot 22 (preferably horizontal) in a member or plate 23, of which the portion around the light-transmitting aperture is opaque. The lamp 20 is enclosed between the plate 23 and a casing 24, and is preferably supported by said casing which in turn is supported in a suitable manner, as by attachment to the plate 23.

As shown in Fig. 2, the light passing from the lamp 20 to the slot 22 is first passed through a plate 25 of diffusing glass secured to the plate 23 by means including clips 26. At the other side of the plate 23, the light from the filament 21 is further narrowed by passing it through a narrow light-transmitting portion or slit 27 in a member 28 slidable along guiding members 29 secured in position at the surface of the plate 23.

The member or plate 23 is supported at its lower edge on a plate or platform 31 and is held in position thereon by suitable means which, as disclosed, include angle members 32, connecting the lower edge of the member 23 with the platform, and inclined braces 33 connected at their upper ends with member 23 and at their lower ends with the platform.

With this particular form of apparatus light variations are caused by rotating a primary pattern 30 in such relationship to the line of light that the latter scans the primary pattern i. e. intercepts directly the rays therefrom and varies the effective length of the line of light in a manner corresponding to the wave form on the primary pattern. The primary pattern is preferably formed on a relatively large scale and in a shape designed for rotation about a definite point thereof. A primary pattern comprising one cycle of a composite wave-form is shown on a reduced scale in Fig. 13, and is shown in connection with other parts of the apparatus in other figures including Figs. 3 and 4. It will be seen that the outer end of the slit 27 may, by sliding the member 28 along the guiding members 29, be adjusted to correspond with the extreme limit reached by the maximum radius of the primary pattern. The inner end of the slit is so positioned that it is never uncovered by the primary pattern during rotation. The result of the adjustment of the outer end of the slit 27 and the positioning of the inner end is to regulate the effective length of the line of light so that its maximum length does not exceed the maximum double amplitude of the wave-form on the primary pattern. Rotation of the primary pattern 30 will therefore cause 100 per cent modulation of the light passing through slit 27. This feature is important because it results in the making of a sound-controlling record which will produce tones with minimum of ground noise.

The primary pattern which varies the effective length of the light slit 27 may be rotated by any suitable means, and as here shown such means includes a shaft 34 perpendicular to the plate 23 and journalled in two standards 35 and 36 projecting upwardly from said platform 31. Between the plate 23 and the adjacent standard 35, the shaft 34 is provided with a carrier 37 for primary patterns. This carrier includes a hub 38 mounted on the shaft and secured thereto in a suitable manner, as by a set screw at the end remote from the plate 23; and also includes a central flange 39. As shown in Fig. 2, the primary pattern 30, which is provided at the center of rotation with an opening 40 (Fig. 13) of sufficient size to receive the end of the hub 38 adjacent to the plate 23, is placed on that end and against the flange 39 which forms a support or table therefor, and is held in place by suitable means, such as a washer 41 and a nut 42 threaded on the hub.

Between the standards 35 and 36 and adjacent to the standard 36, the shaft 34 is provided with a worm gear 43; and this worm gear it attached to the shaft by suitable means, such as a hub 44 fixed on the worm gear and a set screw 45 connecting the hub with the shaft. At its lower side the worm gear 43 meshes with a worm 46 mounted on a shaft 47 journalled at opposite ends of the worm in members 48 projecting from the standard 36. The shaft 47 is driven by a gear 49 mounted thereon and a smaller gear 50 meshing with gear 49 and mounted on the shaft 51 of a motor 52. For reasons to be brought out subsequently, use is made of interchangeable gears 49 and 50 to vary the gear ratio. The gears 49 and 50 should therefore be secured to the corresponding shafts 47 and 51 so that they can be readily applied or removed. To this end the gear 49 is provided with a hub 49a which is secured to the shaft 47 by a set screw 49b, and in the same manner gear 50 is provided with a hub 50a secured to the shaft 51 by a set screw 50b.

In interchanging gears 49 and 50 it is necessary to vary the distance between the motor shaft 51 and the shaft 47. As here shown, this requirement is met by mounting the motor 52 on blocks 53 fitting on and slidable along rods or bars 54 which, by suitable means such as clamping members 55 and screws 56, are clamped in notches in the upper edges of bars 57 secured to the platform 31. When the motor is brought to adjusted position, it may be secured in position by suitable means such as set screws 58 threaded through the blocks 53 and arranged to engage the bars 54.

To reduce the amount of stray light which tends to pass to the location where the sensitized blank is exposed along suitable tracks or paths for the later development of individual patterns, such as light-controlling patterns, the flat beam from the slit 27 is passed through a slot 59 in a screen or baffle plate 60, preferably mounted on the platform 31 so that for any adjustment of the member 28 the slot 59 will be maintained in cooperative relation with said slit 27. The slot 59 is, of course, larger than the slit 27, but the screen 60 reduces the stray light passing to the location where the sensitized blank is exposed.

In order that the light variations caused by the rotation of the primary pattern may be suitably recorded, a sensitized blank is provided, likewise means for its rotation. These parts may for convenience be mounted on the table 68 by means including a base 71 on which is mounted a standard 72 (Figs. 5 and 7). Journalled in the upper end of the standard 72, in such manner as to avoid undue resistance to rotation, is a shaft 73 carrying at one end a blank-holder 74 and at the other end a worm gear 75. This worm gear 75 meshes with a worm 76 on a shaft 77 journalled, at opposite ends of the worm, in bearings 78 adjustably supported by standards 79 mounted on the base 71. The shaft 77 is driven by means including a worm gear 80 fixed thereon and meshing with a worm 81 fixed on a shaft 82 of a motor 83 carried by said base 71.

The holder 74 is illustrated in the general form of a square plate with the corners cut off, and each sensitized blank 84 may conveniently be square and positioned with its sides parallel to the sides of the holder. It is easier to obtain rectangular sensitized blanks and also to handle them, for example in securing them on the plate holder. Furthermore, there is no particular object in having round plates for this purpose, inasmuch as the positives and not the negatives are used as the sound-controlling records. The blank 84 is secured to the holder in any suitable manner as by means of U-shaped members 85 of which the central portions extend across the corners of the blank and the end portions extend through openings in the holder and are held in position by means including nuts 86 screwed thereon. Preferably the central portions of the members 85 are provided with sleeves 87 of cushioning material such as rubber to engage the blank.

An image of the effective portion of slit 27 is formed on the surface of the sensitized blank 84. This result may be attained by means of a device 88, of any suitable form, which includes lenses and may if desired be adjusted for focusing purposes. This device 88, which may include a lens system, is mounted so that its axis is at the same height as the axis of the shaft 73 and so that it may be moved horizontally to position the line of light radially in proper position with respect to different circular paths on the blank 84.

For such horizontal movement, the lens device 88 is mounted in a member 89 (Fig. 7) which in turn is slidably mounted on two horizontal members or rods 90 positioned in substantially the same vertical plane. These members 90 are connected with the upper ends of two upright braces or standards 91 secured at their lower ends on the base 71 and having vertical faces at their sides facing the light-controlling portion of the apparatus. The device 88 is screwed into the member 89 thus providing for adjustment toward and from a blank 84 on the holder 74.

The actual connection between the members 90 and the braces 91 is effected by means of blocks 92 (Figs. 7 and 9) secured to the braces 91 by suitable means such as screws 93 and having in their outer faces notches 94 in which the ends of the rods 90 are held by clamping members 95 engaging said rods on the opposite side from the blocks 92. As here shown, the members 95 are clamped in position by means of wing nuts 96 on screws or bolts 97 which project from the blocks 92 through members 95.

It is desirable in the operation of the apparatus to maintain the device 88 and the line of light at slit 27 in the same relative positions. Consequently means are provided so that the slit 27 may be shifted horizontally to correspond with horizontal shift of the device 88. Referring again to Figs. 2 and 3, the platform 31 is mounted for movement transverse with respect to the shaft 34 carrying the primary pattern, and is supported and guided for such movement by a track formed with two rails 61 here shown in the form of angles arranged with horizontal flanges supporting the platform and vertical flanges engaging the corresponding edges of the platform. As shown, the part mounted on the rails 61 is provided at the outer surface of the member 60 with a downwardly extending pointer 62 to cooperate with a suitable scale 63 on the outer side of the corresponding vertical flange and adapted to determine the position of the platform for different paths on a sensitized blank.

Regulation of the relative amplitudes of the individual light-controlling patterns is of value in connection with recording individual patterns which are adapted to control the production of tones of approximately equal loudness. Such regulation, for example, may be effected by interchange of primary patterns of the required amplitude, or by varying the distance between the light slit 27 and the sensitized blank. To this end rails 61 are mounted on a carriage 64 which in turn is mounted for movement in a direction perpendicular to that of the movement of platform 31. As here shown the carriage 64 is provided with downwardly projecting blocks 65 having at their lower sides notches to receive the upper parts of rails 66 of circular cross section. These rails 66 may be supported in any suitable manner, for example on longitudinal members 67 forming part of the top of a table 68 which also includes supporting legs or posts 69 and connecting members 70.

In order to obtain well defined light-controlling patterns on the negative resulting from the development of a blank 84 after exposure along corresponding paths, the sensitized blank 84 should be protected from all light excepting that passing through the lens device or system 88. For this purpose, there is provided at the front of the machine a plate 98 extending between the upper ends of the braces 91 and interposed between said braces and the blocks 92.

This plate is provided with a slot 99 through which the inner end of the device 88 projects, and the member or block 89 carrying the lens device 88 is provided adjacent to the plate 98 with a plate 100 attached at its middle to the block 89 and extending far enough in both directions from such point of attachment to keep the slot 99 covered irrespective of the position of the lens device 88 along such slot.

The plates 98 and 100 protect the blank 84 only along a relatively narrow range, and to afford complete protection there is provided a casing 101 adapted to cooperate with said plates 98 and 100 to shut out substantially all light except that passing through the lens device 88. Said casing 101 as here disclosed includes side walls, a top and a front wall having therein a slot 102 of sufficient width to accommodate the structure sliding on rods 90, but at the same time to be closed by the plate 98 in conjunction with the plate 100 movable with the lens system.

The sides and front of the casing or housing 101 are rigidly secured to each other and to the top, and fit against the corresponding edges of the base 71. The rear wall 103 of the casing 101 is, however, provided at its top with hinges 103a so as to serve as a door to provide for access to the interior of the casing and also to permit the casing to be moved forwardly sufficiently for the front wall thereof to clear the rods 90 and their associated parts and consequently permit removal of the casing. It should be noted that when the housing is in position to fit around the base 71, the front wall of the housing is in engagement with the braces 91.

In order to determine the positions at which the lens device 88 is to be located in the production of patterns in various paths on a sensitized blank, the member 89 is provided with a pointer 104 to cooperate with a scale 105 on a bar 106 extending parallel to upper bar 90 and supported thereby at its ends. It will be evident that the scale 105 should be graduated to correspond in general with the scale 63 at the other end of the apparatus, but to provide for much finer adjustment. To assist in effecting the fine adjustments required, a magnifying glass 106a is mounted, at the front of the pointer 104, on a member 106b projecting from the member 89 below the pointer.

The focusing device 88 may, of course, take different forms, but as here shown includes an externally threaded tube 116 (Fig. 8) screwed into the travelling member 89 and provided at the end farthest from the plate holder 74 with a head 117 which serves as a convenient means for turning the tube and adjusting the device toward and from the plate holder to focus the light to produce the best effect on the sensitized plate. At the end nearest to the plate holder, the device 88 includes a microscope objective mounting 118 of standard form and secured in the adjacent end of the tube. The objective mounting has two lenses 119 and 120 of compound form positioned at opposite ends of the objective mounting. As stated above, focusing of the objective mounting is obtained by turning the tube 116 in the member 89. The lens system is of such character that the image of the line of light formed on the sensitized blank preferably has a width of approximately .001 inch or less.

The proper focusing is accomplished by positioning a transparent reflector 121 (Fig. 1) in the form of a thin piece of glass in inclined position so that the image on the light-sensitive blank (at a spot on the blank used only for focusing purposes) can be observed through the microscope objective at the same time that the latter is forming the image. The light from the slit 27 passes through the microscope objective and an image of the slit is formed on the blank. Enough light is reflected from the light-sensitive blank to cause some of it to pass through the objective in the reverse direction or toward the slit, and part of this light is deflected to one side by the piece of glass 121 so as to enter the eye of the operator. By moving the lens device 88 in and out, the operator is able to determine the position for which the slit image is sharply focused on the blank 84.

The transparent reflector 121 may be supported in any suitable manner but, as illustrated, is gripped at its lower edge between two clamping members 122 and 123 carried by a block or member 124 which is slidable on an upright 125 and may be secured in any position therealong by a clamping screw 126. Preferably the upright 125 is held in upright position by attachment to a suitable base or stand 127 which rests on a leaf 128 forming part of the top of the table 68 and is shiftable to place the reflector in position for use or to withdraw it from that position.

Although the speed-control problems involved in rotating the blank 84 and the primary pattern 30 will be discussed subsequently in detail, it may be said at this point that the motors 52 and 83, driving respectively the primary pattern and the sensitized blank, are of the synchronous type receiving power from the same alternating current lines 107 and 108. The potential may be 110 volts, and if desired there may be provided switches 109 and 110 to control the motors 52 and 83.

The lamp 20 is connected to direct current lines 111 and 112 under control of a hand switch 113, and for a purpose to be brought out more fully hereinafter there is provided at a convenient position in the circuit a variable resistance 114 and milliammeter 115.

The apparatus just described may be varied to a considerable extent. However, for purposes of illustration, details of a satisfactory form are given, it being understood that these details are not limitations on the invention but are given for convenience only.

The lamp 20 may be a 40-watt Lin-o-lite show case lamp, ten inches long, having a single filament and adapted for use with 110 volt direct current. The slit 27 through which the light from this lamp passes is about .04 of an inch wide and 4½ inches long. The primary pattern 30 has a minimum radius of 1¼ inches and a maximum radius of 5½ inches; that is the maximum double amplitude of the wave-form is 4¼ inches. The distance from plate 23 to plate 60 is about 14 inches and the slot 59 in the plate 60 is about 1.25 inches in width and about 6 inches in length. The scales 63 and 105 are graduated in tenths so that the base lines of the individual light-controlling patterns might be separated by this distance. In one form of sound-controlling record the maximum double amplitude of the recorded wave-forms, measured from the base line, averages approximately .03 of an inch.

The synchronous motors 52 and 83 are designed for 1800 R. P. M. The worm 46 and the worm gear 43 on the shaft 34, carrying the primary pattern, are so constructed as to provide a 100 to 1 speed reduction. The speed of motor 83 by which the blank holder 74 is rotated is reduced through two worm and gear connections first 20 to 1 and second 720 to 1. One complete revolution of the sensitized blank therefore requires eight minutes. Motors 52 and 83 are connected to the same source of 110 volt alternating current. Lamp 20 is lighted by 110 volt, steady, direct current.

It is desirable to be able to control the photographic densities of the individual light-controlling patterns. For example, if it is desired in the recording of light-controlling patterns of the variable width type that the photographic densities of the individual patterns be the same, an adjustment of illumination is required when the recording is done on a revolving disk for the reason that the linear speed of the blank with respect to the line of light image is different for each individual pattern and depends on the distance of the line of light image from the center of rotation of the sensitized blank and distance between the line of light and the light sensitive blank.

This difference in linear speed may be offset by varying the brightness of the lamp 20 step by step as the position of the line of light image with respect to the sensitized blank is changed for the recording of the separate light-controlling patterns. The variation of the brightness of the lamp is effected by use of the rheostat 114 and milliammeter 115. In practice use is made of a predetermined exposure chart which shows correct milliammeter readings for each of the exposure paths.

*Method of operating recording apparatus*

In general the operation of the apparatus above described is substantially as follows:

The primary pattern, as for example that designated by 30 in Fig. 13, is applied to the shaft 34 and secured thereon.

Gears 50 and 49 are selected and secured to shafts 51 and 47 respectively. If it is desired, for example, that 24 cycles of the wave form on the primary pattern 30 be recorded, gear 49 might conveniently contain 288 teeth and gear 50 contain 48 teeth, on the assumption of the speed relationships above given for purposes of illustration.

Motor 52 is then positioned so that gears 50 and 49 properly mesh.

Assuming that the casing 101 has been removed from the base 71 and that the room is in darkness or is lighted by suitable means such as a ruby light, a sensitized blank 84 is placed in holder 74 and clamped thereto by means including the U-shaped members 85, the casing 101 is placed over the base 71, and the rear door 103 is closed.

The lens system 88, by means of the pointer 104 and the scale 105, is placed in position radially of the blank 84 for recording in the desired path thereof. The platform 31 with its light-controlling system, by means of the pointer 62 and the scale 63, is placed in such position that the rays of light from the light slit 27 pass to the said path on the photographic blank substantially perpendicular to the exposed area of the blank. It is assumed that the lens 88 has been pre-focused either on a dummy negative or on a portion of the blank 84 outside of the recording area.

The period of exposure may be limited to one complete rotation of the light-sensitive blank either automatically, for example, as disclosed in the said Goldthwaite application, Sr. No. 305,964, filed September 14, 1928, or manually by the use of an opaque card. In the second method, the opaque card is placed over the light slit 27, the lamp 20 is then lighted by closing switch 113 and the intensity of illumination from the lamp as indicated by the milliammeter 115 is adjusted by means of the rheostat 114 to secure the desired photographic density along the path which is to be exposed.

The motors 52 and 83 are then started by closing switches 109 and 110.

The opaque card previously placed in front of the light slit 27 is then removed thereby exposing the blank 84. The card is replaced in front of slit 27 after the pattern 30 has made the desired complete revolutions (24 in number with the gearing above given for illustrative purposes) which can be determined by use of stop-watch or revolution counter. In this manner a uniform, continuous, circular graph of wave-forms is recorded.

The recording of additional light-controlling patterns on the same blank 84 requires in general a change in ratios between gears 50 and 49, repositioning of the lens system 88 for exposure of each desired path, repositioning of platform 31 to place the light slit 27 in corresponding position so that the angle of incidence of the light rays on the blank 84 shall be substantially the same for all of the patterns or graphs, and adjustment of rheostat 114 to provide for uniformity of photographic density in all of the patterns or graphs by changing the intensity of illumination to compensate for the changes of speed of the several paths of exposure due to their different radial positions on the blank.

For example, if gear 49 contains 288 teeth and gear 50 contains 24 teeth for recording in the first path, and 27, 30, 32, 36, 40 and 45 teeth respectively, for each of the other individual paths, the playing record would contain light-controlling patterns adapted to control the production of the first seven notes in an octave of the natural scale. To provide for the eighth note of this octave and the initial note of the next higher octave, the gear 49 of 288 teeth may be replaced with a gear of 144 teeth starting the series of gears 50 again with 24 teeth. Recordings for additional natural scale notes (accidentals and also other octaves) can be produced by making the required gear changes between motor 50 and the shaft 34 as will be understood by those skilled in the art. No change is required in the gear ratios between the motor 83 and the blank-holder 74.

In recording these patterns or graphs it is convenient and desirable, although not essential, that they be positioned on the recording blank in succession outwardly from the center corresponding with the increase in number of wave-forms in the respective graphs.

Upon completion of the recording process the blank 84 is removed from the apparatus and photographically developed. As a negative it is used to make positive prints conveniently on circular glass disks which are utilized as the sound-controlling records on the playing instrument. One advantage in employing the positive instead of the negative as the sound-controlling record resides in the fact that the former will produce less ground noise when a tone is sounded on the playing instrument.

Figure 15:
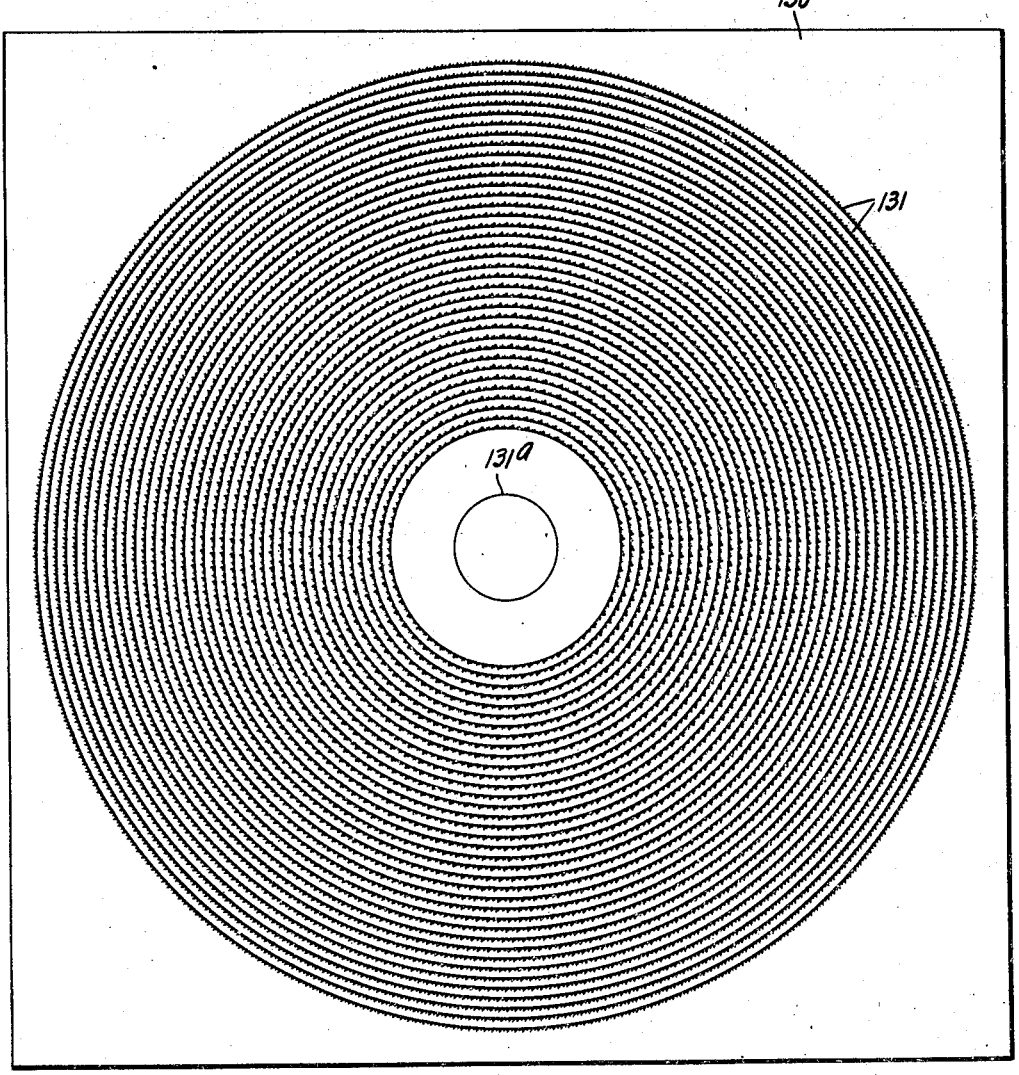
Fig. 15 is a view illustrating a negative sound-controlling record developed on a sensitized blank which includes a plurality of individual patterns or graphs containing composite waves representing notes differing in pitch.
Figure 16:
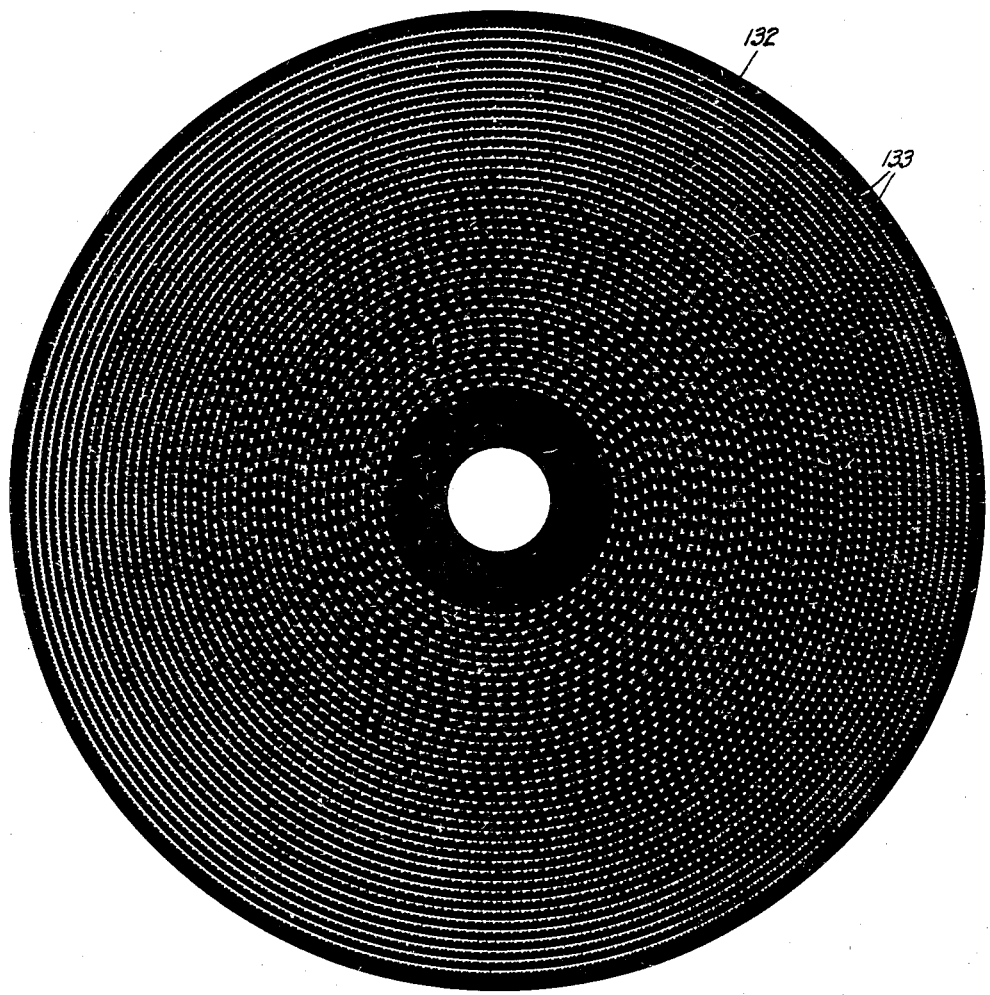
Fig. 16 is a view illustrating a positive taken from the negative shown in Fig. 15.
Figure 17:
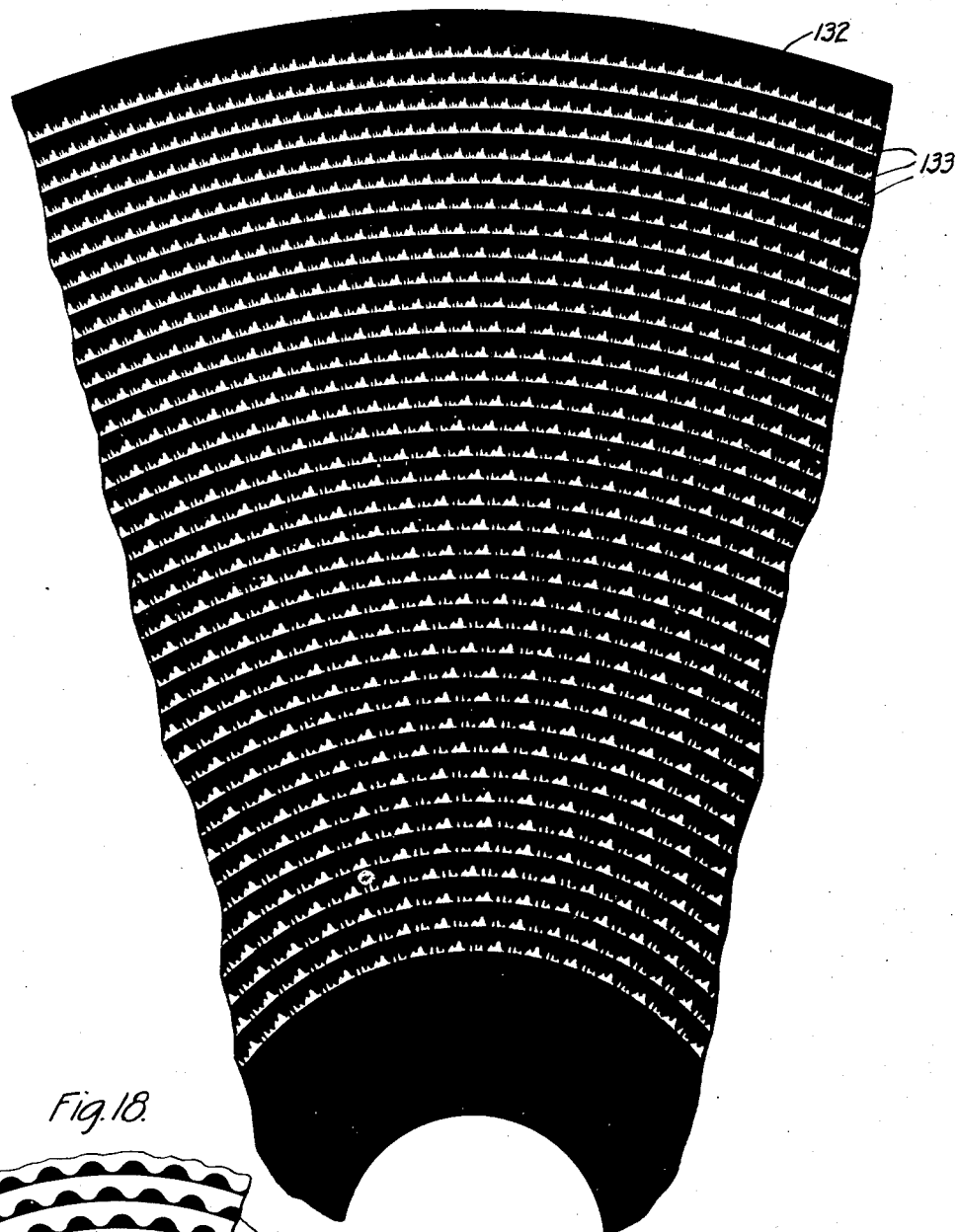
Fig. 17 is a fragmentary view on a larger scale of the positive illustrated in Fig. 16.

A negative 130 with opaque patterns or graphs 131 on a transparent background formed in the above manner is illustrated in Fig. 15 and the positive 132 from such negative in Fig. 16, with the showing of Fig. 17 as an enlarged irregular sector thereof. In these positives the patterns or graphs 133 are transparent on an opaque background. These are made with the primary patterns illustrated in Fig. 13 which is a single cycle of a composite wave-form. The patterns or graphs, therefore, are representative of composite tones. The sound-controlling record of Fig. 16 was made for use on a playing instrument having an effective keyboard of three octaves including the black keys. In the particular record illustrated certain of the individual circumferential patterns or graphs contain wave forms in number not corresponding exactly with the frequencies of the natural scale as in conducting tests it was desirable to extend experimentation outside of the exact frequencies of the natural scale and a record embodying such experimentation and testing is chosen for illustration as it shows the flexibility in the choice in pitch of the notes to be produced.

Furthermore, in preparing Figs. 15, 16 and 17 it has been found necessary to proceed with photography, photolithography and manual inking-in of the bristol-board reproductions filed as the drawings hereof, as the only practical way of illustrating the sound-controlling records actually employed in the manufacture, testing and use of this invention. Fig. 15 is taken directly from a full-sized photographic print of one of the said sound-controlling records but has been reduced in reproduction. Figs. 16 and 17 are taken from the same full-sized print with the black and white reversed better to illustrate the actual appearance of the said record. In the process of making these three figures imperfections, inadvertently and in spite of the greatest care, have been inevitable. This is particularly apparent in Figs. 16 and 17 respecting the continuity of the graphs and in certain misshaped wave forms. Fig. 15 is for the most part an exact reproduction.

No limitations should be read into the invention either by reason of the imperfections in these three figures or by the relation of cycles of waveforms illustrated.

Figure 18:
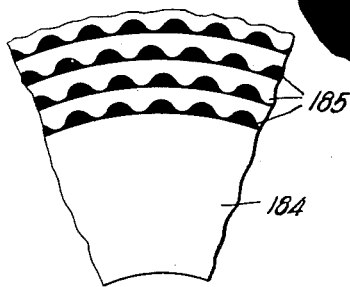
Fig. 18 is a fragmentary view illustrating a negative obtained by use of the primary pattern of Fig. 14.

In Fig. 18 is schematically shown a sector, broken away, of a negative 184 with patterns or graphs 185 formed as above described from a single sine wave primary pattern such as the primary pattern 183 illustrated in Fig. 14. The positives from such negative are for use in the production of simple tones and are particularly for use in the harmonizer feature of the above identified Goldthwaite application as well as in the modifications thereof hereinafter described; although such records may be played with pleasing effect in the rendition of music. The relation of the number of wave forms in the various graphs will obviously be determined by the use for which the record is designed.

In Fig. 15, there will be noted in the center of the figure a circle 131a in accordance with which the sound-controlling record of Fig. 16 is cut away for the purpose of mounting and centering the record on a shaft of a playing instrument to be described subsequently. The latter showing is likewise apparent in the structure of Figs. 17 and 18. It is immaterial to this invention as to the precise manner in which the sound-controlling records are mounted in the player for relative rotation in respect to the illuminating line of light, but in the illustration of that mounting here described as will later be seen, the sound-controlling records are mounted on a shaft.

It has been found convenient, though obviously not essential, to bore the sound-controlling records for this mounting after they have been developed and the circle 131a shown on Fig. 15 forms an exact and convenient guide for this boring. The circle 131a is optically made after the photographic blank has been finally adjusted and mounted on the blank-holder 74 (Fig. 5). After the lens 88 has been focused for recording as above described and preferably before the primary pattern has been mounted for operation, the lens 88 is moved to the desired distance from the center of the blank-holder 74 for the tracing of this line. A spot of light is formed at the slit 27 by manually covering the slit 27 with an opaque card except for the required exposure and this spot of light imaged on the photographic blank which is rotated to expose the path indicated by the said circle 131a.

It will be understood that light-controlling sound records made by the method and with the means specifically illustrated above, will comprise individual, concentric graphs adapted to control the production of tones of different pitch, and that each individual graph will consist of a plurality of idential wave-forms. There is no shift of phase in the wave-forms recorded in the individual graphs, and consequently the first waveform recorded is in phase with the last waveform recorded, and the wave-forms are uniform in character, length and amplitude.

*A form of apparatus suitable for playing the sound-controlling records*

In its broad aspect, the method of utilizing the sound-controlling records (whether of the variable width or variable density type) in the production of musical tones involves relative movement between the individual light-controlling patterns on the records and one or more scanning apertures or beams of light in such a manner as to cause light variations. Through use of a light-sensitive device, such as a photo-electric or selenium cell, connected in circuit with suitable amplifier and loudspeaker, these light variations are converted into electrical variations and then into sound. Shuttters or contact points operated from a keyboard are usually provided so that light may be allowed to fall on the individual patterns selectively at the will of the operator. Suitable means may be provided to actuate the shutters automatically or otherwise automatically to control the light falling on the individual patterns.

Although the playing instrument may vary substantially, a satisfactory form of apparatus useful for testing purposes and which utilizes a sound-controlling record of the disk type and which is to be operated manually is disclosed in Figs. 19 to 22, inclusive. The principle of relative movement employed to effect light variations is that of rotating the disk and maintaining the scanning beam stationary.

A disk type record such as the sound-controlling record 132 (Fig. 16), containing individual light-controlling patterns 133 representing tones of desired pitch relationship, is mounted on a motor driven shaft 202 for rotation at the desired constant speed. Care should be taken in this to assure that the record is accurately centered on the shaft respecting the circular light-controlling patterns so that any eccentricity in their movement is avoided. The mounting means of the primary pattern 30 illustrated in Fig. 2 are suitable for this purpose and are diagrammatically shown in Fig. 19.

The light-controlling patterns are scanned by a narrow stationary line of light positioned radially of the disk 132 between the center of rotation and the edge of the disk, and extending across the space occupied by the patterns. The line of light is formed by imaging on the disk the straight narrow filament 192a of an electric lamp 190 through use of a cylindrical lens 206. The light from the lamp 190 passes through a slot 191 in a lamp casing 192 to an inclined mirror 193 from which the light is reflected to the lens 206. The lens is supported between two members 208 adjustab'y attached to flat members or plates 209 engaging the lens at the top and bottom respectively and secured at opposite ends to uprights or parts 210. The adjustable attachment of the members 208 to the plates 209 may be effected by screws 211 passing through slots 212 (in the flat portions of the members 208 lying against the plates 209) and threaded into the plates 209; and to accommodate the projection of the lens 206 at the corresponding sides of the plates 209 the members 208 near their inner edges are offset outwardly as by arching them. Besides supporting and positioning the lens the two members 208 serve to prevent light passing through the edges of the lens thus minimizing aberration. The mirror is used for convenience to make the optical system more compact.

In order that the light passing through the lens 206 may be allowed to fall on the desired light-controlling patterns selectively, shutters 203 placed edge to edge are interposed between lens 206 and the record 132, and are mounted on vertically reciprocable upright bars 204 preferably by means of perpendicular offsets 205 fastened to said bars at the sides thereof. The reciprocal bars 204 are held in position by guiding slots in stationary guide bars 207.

Below the shutters 203, the uprights 204 carrying the same are connected by pivots 215 with levers 216 mounted on a fixed pivot or pivots 217 carried by supports 218. The levers 216 are pivotally connected at their forward ends with keys 219 which are pivotally mounted on a fixed support 219a. As here shown the keyboard may be similar to a piano keyboard.

To maintain the shutters 203 normally in closed position, each upright 204 is connected at its upper end with a helical spring 220 of which the upper end is connected with a hook at the lower end of a vertical rod 220a slidably mounted in a cross bar 221 connecting the posts 210 and held in adjusted position by means of one or more screws 222. It will be evident that by depressing any one of the keys 219 the corresponding shutter will be moved to a position permitting light to fall on and scan the corresponding pattern on the rotating record 132. The action of spring 220 and the lever action of bars 216 and keys 219 maintain the keys in normal position when not depressed.

The light variations so caused pass to photo-electric cell 196 through a slit 194 in a casing 195. The photo-electric cell is connected by means of wires 197 and 198 to a suitable source of electric potential. The current variations are amplified as by amplifier 198a and converted into sound by a suitable loudspeaker 200. Thus by actuating the various keys in proper sequence, singly or in combination, a musical composition may be played.

As the loudness of each tone produced as above is a function of the amount of light passing the individual pattern representing that tone and falling upon the photo-electric cell, such loudness is within the control of the operator in regulating the distance he depresses the key (219) in playing the note. Accurate phrasing in the rendition of music is thus provided.

The tuning of the instrument as to pitch (standard, concert, etc.), is effected by adjustment of the speed of rotation of the sound-controlling record in any well-known and suitable manner.

*Method of and means for synthesizing partials to develop a tone of desired quality*

The playing instrument illustrated in Figs. 19, 20 and 21 may also be used in connection with developing or building up a composite musical tone of desired quality. A sound-controlling record comprising individual patterns representative of pure sine waves in the relation adapted to control the production of a fundamental tone and the desired number of harmonic overtones, is mounted for rotation at the desired constant speed on the motor driven shaft 202. A fragmentary view of the negative of such a record is illustrated in Fig. 18. The amount of light falling on each of the partials is controlled in a suitable manner, as by varying the extent to which the various shutters 203 are opened. Such control of the opening of the shutters may be effected by means, such as indicated in Fig. 22, wherein a plate 225 having a strengthening flange 226 extending downwardly therefrom along the front and side edges is suitably mounted above the keys 219 and provided with screws 227 threaded downwardly therethrough in suitable positions to engage the various keys 219. The plate 225 is illustrated as detachably secured to the fixed uprights 228 by suitable fastening devices 229. The uprights 228 may conveniently be attached to the same supporting members 219b as the key lever supports 219a.

By adjustment of the screws 227, the intensity of the various partials ultimately selected (empirically or otherwise) and determined by the keys depressed may be varied until the loudspeaker emits a composite tone of the desired quality or timbre.

It is desirable for certain purposes to be subsequently explained to measure the current variations in the photo-electric cell circuit caused by light passing through each of the light-controlling patterns. This measurement may be obtained, without varying the adjustment of the shutters by shutting off the light from all but a selected shutter opening and measuring the current variations in the photo-electric cell circuit by means of a current measuring instrument 231 connected in that circuit. The measurement of the variation in current produced by the selected pattern may be made satisfactorily by turning the record slowly by hand and noting the maximum and minimum current values. This procedure would be followed for each shutter opening or corresponding individual pattern.

The shutting off of light from all but one of the shutter openings, may conveniently be carried out in the manner illustrated in Figs. 20 and 23. For this purpose, provision is made of a plurality of cards 235 adapted for mounting in a card guide 236 having an upright portion 237 to determine the position of the cards in a lateral direction and a horizontal portion 238 to support the cards when in use. It will be understood that said upright and horizontal portions are provided with grooves to receive the edges of the cards. Preferably there are as many cards as shutters and each card is provided with a suitable opening 239 as illustrated in Fig. 23 for two successive cards. A convenient way of handling these cards 235 is to start with the card having an opening 239 positioned to correspond with the position of the left hand shutter, insert this card in the guide 236, and measure the current variation as described. Then another card may be put in, thus shutting off all the light from the photo-electric cell 196, and the first card taken out, thus exposing a pattern corresponding to the opening in the second card and enabling another measurement of current variation to be made. This procedure would be continued until measurements of current variations for all of the individual patterns illuminated have been made. In effect this procedure determines the relative amplitudes of the selected partials which were combined to make up the composite tone of desired quality.

*Methods of and means for making a tempered scale sound-controlling record*

The two musical scales which are presently most useful are the natural and tempered. The frequencies of the successive notes in an octave of the natural scale beginning with the keynote are related to each other as

1:9/8:5/4:4/3:3/2:5/3:15/8:2.

This relationship may be expressed in terms of the integral series 24, 27, 30, ... 48, integral waveforms of equal length and their octaves, the record may be utilized to control the production of notes of the natural scale regardless of the desired pitch of the keynote. The pitch of the keynote depends on the speed of rotation of the disk and the number of integral wave-forms contained in the graph representing the keynote and, therefore, may be regulated and determined as desired.

Such a natural scale record can be readily made by using the apparatus illustrated diagrammatically in Fig. 1 and described above in detail. The gear ratios required are comparatively simple, have been set forth in part in the above description covering the use of a primary pattern containing one wave length of a sine or composite wave form, and are well within the knowledge of those skilled in the art.

To make a sound-controlling record comprising individual light-controlling graphs which will control the production of tones that are related to each other in pitch as the notes of the tempered scale is a more difficult problem. One difficulty arises from the fact that it is impossible to reduce the tempered scale pitch relationship to a corresponding series of integral numbers which are small enough to be useful.

To illustrate the problem, suppose for example that the record in the form of a disk is to be rotated on the playing instrument at the rate of one revolution per second and that middle A is to be pitched at 440. In order to be able to control a steady tone of this pitch the individual light-controlling graph representing middle A would then contain 440 integral wave forms of equal wave length. In this event the graph representing D below middle A would contain 293.6648 wave-forms. The first wave form recorded would be out of phase with the last partial wave-form recorded, their juncture would be imperfect and would result, when played, in periodic thumps or breaks in the continuity of the tone. And even though the recording were stopped after 293 integral wave-forms of equal length had been recorded thereby omitting the .6648 part of a wave length, the abrupt shift in phase between the wave forms first and last recorded would cause a disagreeable thump when the note is sounded on the playing instrument.

As a result of extensive experimentation it has been found that these thumps may be avoided by controlling the recording in such a manner as to divide the total required phase shift into several or more smaller phase shifts, no one of which is of sufficient magnitude to cause an audible thump when the note represented by the pattern is sounded on the playing instrument. If the division of the total required phase shift is properly made the pitch of the tone is not noticeably affected.

One method of dividing up the abrupt phase shift is to vary at pre-determined intervals and in pre-determined amounts the relative speeds of the primary pattern and the recording blank. One satisfactory form of apparatus for carrying out this method is illustrated in Figs. 24 to 28, inclusive. That apparatus except as hereinafter described is similar in construction and mode of operation to that shown in Fig. 2, and is intended to replace the apparatus of Fig. 2 on the table 68 (Fig. 1).

In the apparatus of Figs. 24 to 28, inclusive, a differential 240 has been introduced between the worm gear 43 and the primary pattern 30 of Fig. 2. The shaft 34 of Fig. 2 is divided into two parts, one 34a connected with the worm gear 43 and the other 34b, connected with the carrier 37 for the primary pattern 30. To support the adjacent ends of the shaft sections 34a and 34b, respectively, standards 35a and 36a are provided between the standards 35 and 36.

As shown most clearly in Fig. 25, there is fixedly mounted on the shaft 34a, at the inner side of the standard 36a, a member 241 having a cylindrical body and at its end distant from the standard 36a an enlarged cylindrical portion 242 on which is loosely mounted a worm gear 243 carrying the differential pinions 244 mounted as shown in Fig. 26 in openings in said worm gear 243. The differential pinions 244 are in the form of bevel-gears mounted on pivots 245 and mesh on one side with a bevel-gear 246 of which the hub 247 is fixedly mounted on the cylindrical body of the member 241 and is connected with the shaft 34a by suitable means, such as a set-screw 248, which passes through the member 241 and serves to secure both the members 241 and 247 to the shaft 34a.

At the other side of the worm gear 243 the differential pinions 244 mesh with a bevel-gear 249 having a hub 250 mounted on the end of the shaft 34b and secured thereto by a set-screw 251. When the shaft 34b is driven from the shaft 34a through the differential 240, there is a tendency to force apart the two members 246 and 249. As illustrated in Fig. 25, a spring 252 is interposed between the standard 35 and a collar 253 fixed to the shaft 34b by a suitable device 254, and serves to maintain without loose motion the meshing of the gears of the differential.

To control the worm-gear 243 of the differential 240, there is provided a worm 255 on a sleeve secured to a shaft 256 by a fastening device 257. The end of the shaft 256 on which the worm 255 is mounted, is preferably journalled in a block 258 having therein a recess 259 of sufficient length to receive the worm member the ends of which bear against the ends of the recess. The block 258 may be supported in any suitable manner, as, for example, by means of a screw 260 passing through the block 258 and into the standard 36a.

For purposes of clearance the shaft 256 is disposed so that it has a downward inclination from the point at which the worm 255 meshes with the worm gear 243 and terminates at the front of the apparatus where it is provided with an operating member or disk 261 provided with a handle 262. The lower end of the shaft 256 is journalled in brackets 263 and 264 projecting upwardly from the platform 31, the latter bracket 264 being provided with a graduated dial 265 to cooperate with a pointer 266 fixed on the shaft. As indicated on Fig. 24, the circumference of the disk 265 is calibrated in degrees by means of which the number of degrees through which the shaft 256 is turned can easily be determined.

It will be evident that by turning the shaft 256 through the pre-determined number of degrees and at suitable intervals, the total required phase shift can be divided into the desired number of smaller phase shifts. The direction of the shifts will depend on whether the handle 262 is turned clockwise or counter-clockwise, and the sum of the phase shifts in any one pattern path need not exceed 180°. For example, if the relative speeds of the primary pattern 30 and the light-sensitive blank 84 are such that wave forms are being recorded at the rate of 288.40 wavelengths for one complete rotation of the blank a total phase shift of 144° can be made in the direction of rotation of the blank, whereas if wave-forms are being recorded at the rate of 288.75 wave-lengths for one complete rotation, it would be preferable to make a phase shift of 90° counter to the direction of rotation of the blank.

As will be readily understood the above described method of dividing up the total required phase shift into smaller inaudible phase shifts by changing at intervals the relative speeds of the primary pattern and the light-sensitive blank during the recording process results in varying the wave-lengths of one or more of the wave-forms in the graph and in bringing the first and last wave-forms recorded substantially into phase. In Fig. 29 there is illustrated schematically a composite wave-form in which the wavelength has been shortened in the manner above described, and in Fig. 30 a composite wave-form which has been lengthened.

The apparatus shown in Fig. 24 as above described embodies the means for varying, during the recording of a pattern, the normally constant relationship between the speeds of rotation of the primary pattern 30 and the blank 84, in order to divide an abrupt phase shift into smaller phase shifts of such size as not to cause audible thumping sounds in the playing of the record. In addition to avoiding abrupt phase shifts, it is generally necessary when making a tempered scale record utilizing a primary pattern such as 30, to relate the speeds of rotation of the primary pattern to that of the blank 84 in a way which is difficult of accomplishment with desirable accuracy by using any simple train of gears between shafts 51 and 34a. This difficulty may be overcome by properly manipulating the differential 240.

For the purpose of illustrating the operation of the apparatus shown in Figs. 24 to 28, inclusive, it may be assumed that it is desired to make a tempered scale record which is to be rotated on the playing instrument at one revolution per second and that middle A is to be pitched at 440. The pattern or graph representing middle A on the record would then contain 440 wave-forms of equal length. Inasmuch as the primary pattern 30 contains only one wave-length, it must therefore make 440 revolutions while the blank 84 (Figs. 1 and 5) makes one revolution. On the assumption of the specific example above given with the motor 52 having a speed of 1800 R. P. M., and the blank 84 rotating once in eight minutes, this requirement is readily satisfied by having gear 50 contain 110 teeth, gear 49 contain 36 teeth, and worm gear 43 contain 100 teeth. In the illustrative eight minute recording period, pattern 30 will make 440 revolutions, i. e.:

$$\frac{1800 \times 8 \times 110}{100 \times 36} = 440$$

No movement of differential 240 is therefore required.

Under the above assumptions the D below middle A would be pitched at 293.6648. A graph which will control the production of a tone of this pitch and still not cause a thumping sound may be recorded in the following manner. The gear train between shafts 51 and 47 is changed so that gear 50 contains 73 teeth, and gear 49 contains 36 teeth. This particular train of gears would normally cause the primary pattern 30 to make 292 revolutions during the eight minute period, i. e.:

$$\frac{1800 \times 8 \times 73}{100 \times 36} = 292$$

This speed of the 292 revolutions may be adjusted to 293.6648 by utilizing the differential gear to add the factor 1.6648. This is satisfactorily accomplished by turning manually the handle 262 at such a constant rate and in such direction that the worm gear 243 makes .8324 of a revolution during the eight minute period of exposure. This speed of rotation of the worm gear will adjust the primary pattern speed of 292 to the desired speed of 293.6648 revolutions per eight minutes, since the ratio of speed between worm gear 243 and primary pattern 30 is 1 : 2.

The pitch of the worm may conveniently (for purposes of illustration but not limitation) be so related to the number of teeth on the worm gear 243 that one complete turn of the handle 262 rotates the worm gear 243 through .01 of a revolution. The above movement of the worm gear 243 would, therefore, require that handle 262 be turned at the rate of 83.24 times per eight minutes. In maintaining this rate of speed use is made of the degree calibrations on the scale 265 and an accurate time piece such as an electric clock.

Having now related the speed of primary pattern 30 to the light-sensitive blank 84 as 293.6648:1, the recording process is started as hereinabove described in reference to the apparatus of Fig. 2. The total phase shift required to bring into phase the first and final wave forms recorded in this example is .3352 of a wave length, that is 120.672 degrees (360×.3352), and this may conveniently be divided into 20 shifts of approximately equal size. The distribution of the smaller phase shifts in the sound-controlling pattern (approximately 6 degrees each) may be made by interrupting the constant rotation of the handle 262 to give a quick motion of the required amount (approximately 302 degrees) every 24 seconds during the eight minute period of exposure. If the handle 262 is properly manipulated the worm gear 243 will rotate once in the direction of movement of primary pattern 30 thereby adjusting its movement so that during the eight minute period of exposure it will have rotated exactly 294 times [292+2(.8324+.1676)].

The phase shifting and speed control requirements of the other tempered scale graphs may be similarly satisfied.

In the specific illustration given above the assumption has been made that the graph representing D below middle A, when rotated on the playing instrument at the rate of one revolution per second, would control the production of a tone having a pitch of 293.6648, and consequently that the pitch is unaffected by the phase shifts. Although in the development of this invention I have not noticed any change of pitch by reason of the phase shifting above described, some change would be suspected on the basis of the well-known Fourier method of analysis. If, after further refinements, it is found that the phase shifts do cause a noticeable change in pitch, such change can easily be compensated by driving the differential gear at a different rate, thus regulating the pitch as desired.

It will be readily understood that the method of dividing the total required phase shift into a plurality of smaller phase shifts described above in detail in connection with making tempered scale light-controlling records is applicable to making tempered scale sound-controlling records of the siren type regardless of the principle of current variation utilized by the electrical instrument in combination with which the record is to be used.

Although the preferred method of making a light-controlling sound record is to record directly on a light-sensitive blank the light variations caused by scanning a primary pattern with a line of light, satisfactory results may also be obtained by causing the light variations to fall on a photo-electric cell in circuit with a suitable amplifier thus converting the light variations into corresponding current variations. The resultant amplified current variations may be used to operate a light-varying device for photographic recording, or to operate an electrically-controlled cutting tool, recording magnet, or other recording device to make records which are suitable for use in connection with other types of electrical musical instruments.

The slow method of recording disclosed above simplifies the photographic and speed-control problems. It will be noted that in making sound-controlling records which are to be revolved on the playing instrument at one or more revolutions per second it is not necessary to vary the light at a fundamental frequency of more than ten cycles per second. This maximum rate of variation would record a pattern adapted to control the production of a tone having a fundamental pitch of 4800, i. e., $$10 \times 60 \times 8 = 4800$$

Obviously the speed of recording may be varied over a wide range and made as slow as desired. This method, therefore, is a substantial improvement over methods which require the conversion of electrical variations of comparatively high frequencies into light variations, thereby necessitating a comparatively rapid rate of recording.

*Primary patterns*

The primary patterns hereinabove referred to and of which illustrations are presented in Figs. 13 and 14 may well be considered as cams for controlling the variations of light which fall upon the sensitized photographic blanks and for determining the character and form of the sound-controlling patterns recorded thereon. As these primary paterns or cams act directly in the control of such light rays, their structure and method of manufacture are simplified as compared with those in a system of recording in which intermediate mechanism is employed.

The material of which the primary patterns are made should be opaque, and if the pattern is designed for rotation, the material should be of sufficient rigidity to rotate without flexure or vibration. Thin metal has been found a satisfactory material for this purpose.

One of the advantages of utilizing a primary pattern of the character described to control the recording on the blank is that this method makes it possible to predetermine the wave-form embodied in the primary pattern i. e. its shape is entirely within the selective control of the operator. The wave-form may be predetermined in a number of different ways, for example as follows:

(1) The periphery of the primary pattern may be shaped arbitrarily without regard to the component partials of the resultant wave-form. Such arbitrarily shaped primary patterns may then be recorded on the record blank, and tested on the playing instrument to select those which produce tones of desired quality.

(2) The wave-form of the primary pattern may be shaped to conform to the wave-form of an oscillograph recording of a tone produced by a musical instrument or voice. A selected wave-form of the enlarged oscillograph recording normally made along a horizontal axis may by means well known to the art be transferred to the circular axis line of the primary pattern without analysis of the component partials.

Although the above two methods of preparing primary patterns have yielded interesting results the preferred methods of predetermining the wave-form are (3) to synthesize selected harmonic wave-form components with desired relative amplitudes. This synthesis operation may be conveniently accomplished by utilizing a mechanical synthesizer such as described on page 113 of "The Science of Musical Sounds" by Miller (The Macmillan Co. 1926) or in the article "A mechanical synthesizer" appearing in the August 1922 issue of the Journal of the Franklin Institute. This apparatus may be employed in drawing the desired curve for the sine wave primary pattern for simple tones as well as the curve to be embodied in the primary pattern for composite tones.

(4) to determine by analysis the component partials of a tone of desired quality and likewise their relative amplitudes, and subsequently to synthesize the component partials with their relative amplitudes adjusted to compensate for the optical and electrical distortion of the recording and playing apparatus. This analysis and synthesis may be readily accomplished in a variety of ways well known to the art.

(5) to build up a tone of desired quality by employing a sine-wave sound-controlling record, illustrated in Fig. 18 with graphs in harmonic relation, and to determine in the manner fully described in the above discussion, the wave-form of the primary pattern adapted to reproduce the tone thus synthesized.

As herein illustrated the primary patterns are shown as containing but one complete wave-length. It will be understood that they are not of necessity so limited and that if more than one wave-length is employed the gear ratios and relative rates of speed between the primary pattern and recording blank will be regulated accordingly.

*A modified form of playing apparatus*

Figure 31:
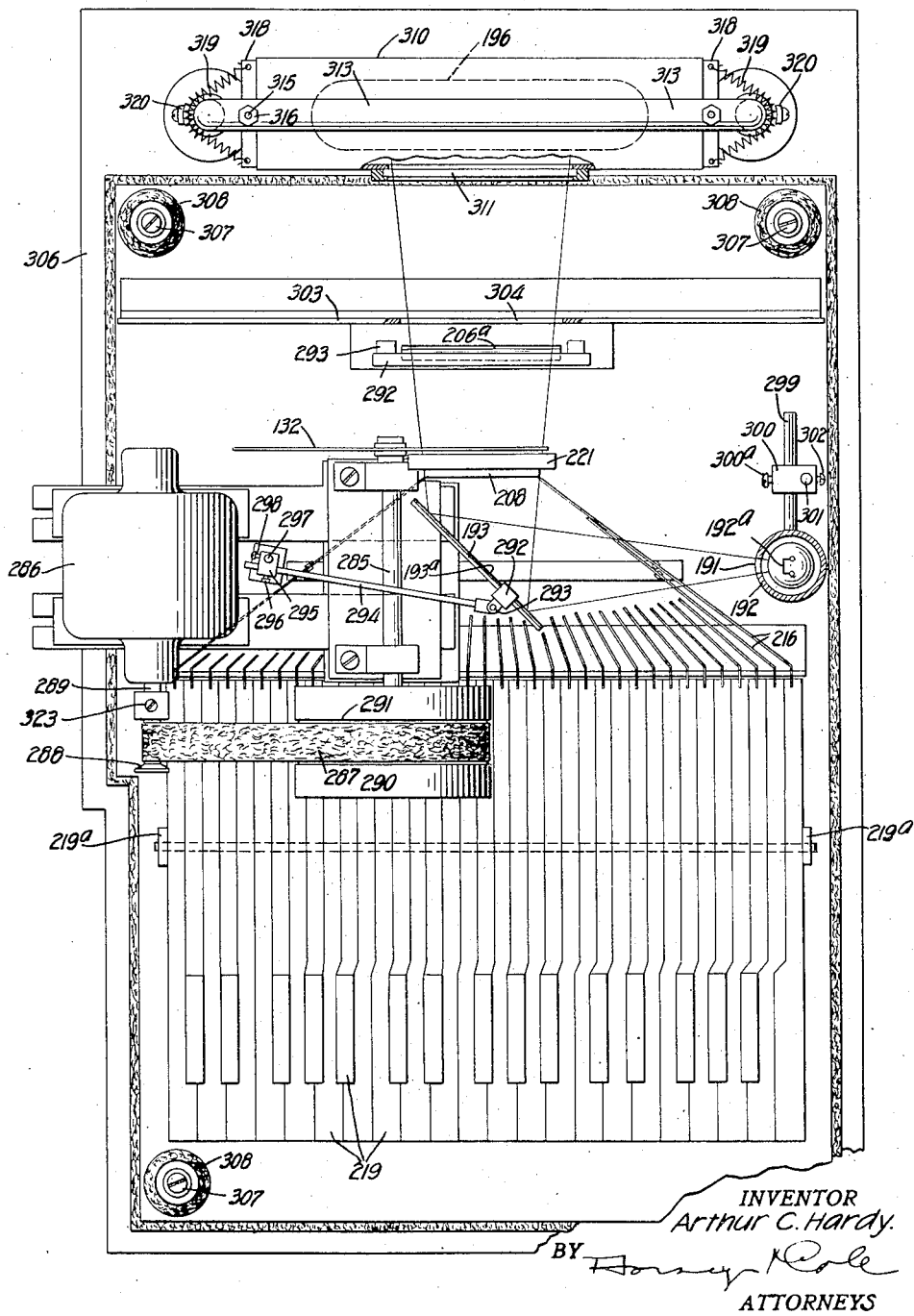
Fig. 31 is a view similar to Fig. 19 of a modified form of player.

In Figs. 31, 32 and 33 is illustrated a manually operated playing apparatus suitable for the playing of sound-controlling records either of the variable density type or the variable width type of graph, of the general character disclosed herein and in the aforesaid Goldthwaite application, Sr. No. 305,964, filed September 14, 1928. This playing apparatus is generally similar to that shown in Fig. 19, and embodies a suitable amplifier and loud speaker connected with and controlled by a light-sensitive device, such as a photo-electric cell, in the manner described in considering the player of Fig. 19, to which reference may be had without repetition. In the modified form of apparatus the shutters are controlled by keys 219 in the same general manner as in the first form referred to. There is no change in the shutter assembly 221 (including lens 206) and its position relative to the sound-controlling record 132.

The sound-controlling record 132 is mounted on a shaft 285 in suitable bearings and driven from a motor 286 by means including a belt 287 passing around a small pulley 288 on shaft 289 of the motor, and also around a fly-wheel 290 on the shaft 285. Preferably the motor is of the constant speed synchronous type. The fly-wheel 290 may be provided with a groove 291 to receive the belt 287. It will be evident that the fly-wheel acts as a mechanical filter to maintain the speed of the shaft 285 constant. To provide for the use of different sizes of pulleys 288 and different lengths of belts 287, the motor may be mounted on rails or slides 286a and be secured in position by bolts 286b projecting from the motor through slots in the rails and cooperating with wing nuts 286c.

Due to the position of the motor 286 at the left of the apparatus, the casing 192 containing the lamp 190 is placed at the right of the apparatus and the light which passes through the horizontal slit 191, is reflected by the mirror 193 in a direction to pass through the lens 206 in the shutter assembly 221 and then through the disk 132 to the lens 206a. Preferably the lamp, although placed vertically, includes a filament 192a arranged parallel to and adjacent to the slit 191. As here shown, the mirror is held in a clamp 292 pivotally connected at 293 with a generally horizontal rod or bar 294 which, in turn, is slidable in a block 295 and may be held in adjusted position therein by means of a set-screw 296. The block 295 is pivotally mounted on an upright member or rod 297, and may be clamped in adjusted position thereon by a set-screw 298. The rod 297 is fixedly supported in any suitable manner. It will be seen that the mirror 193 can be adjusted to any desired position.

For convenience in handling, the mirror 193 may be much larger than is necessary for the reflection of light from the slit 191, and to cut down the stray light it may be desirable to reduce the effective size of the mirror. Preferably this reduction is obtained by applying to the face of the mirror an opaque mask 193a, as of black paper, and having a slot 193b of such size as to expose the desired area of the mirror.

To aid in adjusting the direction of the light thrown on the sound-controlling record 132, the lamp casing 192 is fixed on a horizontal rod 299 mounted in a block 300 and adjustably secured therein by a set-screw 300a. The member or block 300 may be secured in adjusted position on a vertical rod 301 by means of a set-screw 302. Also mounted on the plate 219b is a screen 303 provided with a horizontal slot 304 through which the light from the lens 206a passes to the photo-electric cell. It will be seen that this screen 303 cuts off the stray light.

The photo-electric cell should be protected to as great an extent as possible from vibration due to the operation of the playing instrument, and to this end it is placed further from disk 132 than is shown in Fig. 19. To assist in producing this desired result the plate 219b is mounted on a vibration-deadening sheet 305 of suitable material, such as felt, which in turn is supported by a table 306. The plate 219b may be secured to the table 306 in any suitable manner, as by screws 307, which pass loosely through openings in cushioning washers 308 at the upper side of the plate 219b and openings both in the plate 219b and the sheet 305.

The photo-electric cell 196 is mounted in a casing 310, into which the light from the lens 206a passes through a window closed by a glass plate 311. This casing 310 is resiliently supported, both in a vertical direction and in a longitudinal direction. To this end there is provided a frame comprising uprights or posts 312 and a top member or bar 313. The casing 310 is suspended from the bar 313 by springs 314 attached at their lower ends in any suitable manner, and at their upper ends to threaded rods 315, passing through the top bar 313, and adjustably secured therein by nuts 316 and 317 at the top and bottom respectively of said bar 313.

To hold the casing 310 against longitudinal movement, the casing is provided at each end with two horizontal members, or bars 318, which may be in the form of angles, and to each of these bars 318 are secured the ends of helical springs 319, the springs 319 at each end of the casing passing around the corresponding posts 312, and being clamped thereon by means of a metal strip 320, secured in position by screws 321. The upper bar 318 at each end of the casing 310 may be utilized in securing the lower end of the corresponding spring 314 to the casing. The period of vibration of the casing or box 310 may be lowered by increasing its weight or mass and to this end the casing is preferably made of heavy material such as lead.

In operation the lamp 190 is lighted by a steady non-varying source of current and the motor 286 is started and run at a constant speed. The instrument is operated from the key board in like manner as the player of Fig. 19. The straight narrow filament 192a in the lamp 190 is selectively imaged radially across the sound-controlling record 132 through the lens 206, the selectivity being under the control of the key-operated shutter. The light rays passing through the playing record and determined by the graph or graphs 133 illuminated are focused on the photo-electric cell 196 by the intermediate lens 206a. This incitation of the photo-electric cell results in selected tone production, through the amplifier and loud speaker as in the case of the player of Fig. 19.

In general the volume of sound may be varied and controlled by three means acting jointly or separately: (1) A potentiometer (not shown) may be connected in circuit between the photo-electric cell and the loud-speaker and positioned for convenient operation as by a knee-pedal located under the keyboard; (2) A rheostat (not shown) may be connected in the light circuit and may conveniently be similarly located under the keyboard and operated by knee-pedal; (3) The distance the keys are depressed regulates volume as previously explained. Volume controls (1) and (2) above may likewise be conveniently positioned and operated by controls (not shown) situated above the keyboard.

The tuning of the instrument as to pitch (standard, concert, etc.) is effected by adjusting the speed of rotation of the sound-controlling record by interchange of suitable pulleys 288.

In Fig. 34 there is illustrated a modified form of means operable by the key-levers 219 to control the position of the shutters 203. The shutters are mounted as before on vertically movable bars 204 slidable in slotted guide-bars 207, but are biased downwardly toward a cross member or bar 330 by individual springs 331, each connected at one end with a corresponding bar 204 and at the other end with the bar 330. The lower end of each bar 204 is engaged by a member 332 guided in a member 332a in the bar 330, for vertical movement in both directions under control of a flexible core or wire 333 forming part of a Bowden wire 334 of which the inextensible outer casing 335 is attached rigidly at one end to the lower end of a corresponding member 332a in the guide bar 330 and at the outer end to the upper part of a guide 335a (similar to 332a) in the bar 336 above the inner ends of the key levers 219. It will be understood that the core 333 is attached to a rigid member 337 guided for vertical movement in a guide 335q in the bar 336 and that the lower end of the member 337 is always held in contact with its corresponding key lever by the weight of the corresponding shutter bar 204 and the pull of the spring 331. The shutter carrying bars are very close together and the necessary compact arrangement of the vertically movable members 332 is obtained by placing them in staggered relation. Obviously the operation of a key lever in the ordinary manner will raise the corresponding shutter in accordance with the extent of operation of the key. This modification is adapted for use in both of the playing instruments hereinbefore described.

*Optical and speed-control considerations*

The importance of high frequencies in the production of musical tones having brilliance and definition is well known. The optical system of the recording and playing apparatus herein presented as a specific example has been carefully designed to avoid objectionable scanning losses and the consequent attenuation of high frequencies.

Although it is not possible in order to avoid scanning losses due to the image width effect to make the light slit 27 or its image on the blank 84 infinitely narrow, the parts should be so proportioned and adjusted that slit 27 is made as narrow as practicable compared with the wave length of the highest frequency component of the composite wave-form on the primary pattern and, likewise, that the width of the slit image on the light-sensitive blank 84 is made as narrow as practicable compared with the wavelength of the highest frequency component of each wave-form to be recorded. Similarly, the line of light imaged on the sound-controlling record in playing the record should be as narrow as practicable compared with the wavelength of the highest frequency component of each wave-form on the record.

The apertures and light images should be carefully positioned radially with respect to the primary pattern, the blank, and the playing record so as to avoid scanning losses due to the azimuth effect.

The method of and means for making sound-controlling records above described including the design of the optical system, make it possible to keep the scanning losses within satisfactory limits. If desired, these scanning losses, which can be determined mathematically and experimentally, may be compensated for in the formation of the primary pattern by properly adjusting the relative amplitudes of the component partials constituting the wave-form on the primary pattern.

In order to be able to produce a steady musical tone free from objectionable pitch variation, rigid speed regulation is required for both the recording and playing apparatus. Since a good musical ear will detect sudden changes in pitch of only one-half of one per cent, speed regulation better than this percentage is desirable.

In the recording process it is desirable that the linear speed of the light-sensitive blank 84 be constant with respect to the light image formed on its surface in order to prevent objectionable variations in the wave-lengths of the recorded wave-forms and variations in photographic density. This requirement is herein illustrated as met by using the synchronous motor 83 and accurately machine gears. For example, in the apparatus constructed, tested and satisfactorily operated as an embodiment of this invention prior to the filing of the application for this patent, the worm gear 75 containing 720 teeth, was carefully cut with the aid of a microscope. Uniform speed of the primary pattern is herein illustrated as obtained by use of the synchronous motor 52 and a carefully machined train of gears. Except for variations in speed brought about intentionally, as for example, by manipulating the manually operated differential 240, the ratio of speed of the light-sensitive blank 84 to the speed of the primary pattern may be kept constant by connecting the two synchronous motors to the same source of alternating current. Mechanical or electrical filters may be used to eliminate speed variations but have not been found necessary in the apparatus specifically described due to the slowness of the recording process, the use of synchronous motors, and the accuracy with which the gears have been machined.

The term "continuous" where used to describe a graph of wave-forms is intended to mean "endless".

The foregoing detailed description has been given for clearness of understanding, and no undue limitations should be deduced therefrom. Many detailed and specific illustrations have been presented to aid in a comprehensive grasp of the broad scope of the invention and to facilitate the practice of the invention by those desiring so to do. Experience has shown that this invention may take many forms and that its component parts as herein presented are subject to extensive variation, all without departing from the principles and spirit of the invention. These facts should be taken into account in considering the scope of the appended claims which should be construed as broadly as permissible in view of the prior art.

Having thus described my invention, I claim:

1. The method of producing a sound-controlling record which includes causing light variations by scanning a primary pattern with a line of light and utilizing the light variations to control the recording on a record blank of a graph of identical wave-forms.

2. The method of making a sound-controlling record which includes producing light variations by scanning a primary pattern with a line of light, and utilizing the light-variations to control the recording on a record blank of a plurality of individual graphs of identical wave-forms representing tones of different pitch.

3. The method of making a sound-controlling record which includes producing light variations by scanning a primary pattern with a line of light, and utilizing the light variations to control the recording on a record blank of a continuous graph of identical wave-forms.

4. The method of producing a sound-controlling record which includes causing light variations by scanning a primary pattern with a line of light and utilizing the light variations to control the recording on a light-sensitive blank of a graph of identical wave-forms.

5. The method of producing a sound-controlling record which includes causing light variations by scanning a primary pattern with a line of light and utilizing the light variations to control the recording on a light-sensitive blank of a plurality of individual graphs of identical wave-forms representing tones of different pitch.

6. The method of producing a sound controlling record which includes causing light variations by scanning a primary pattern with a line of light and utilizing the light variations to control the recording on a light-sensitive blank of a continuous graph of identical wave-forms.

7. The method of producing a sound-controlling record which includes causing light variations by scanning a primary pattern with a line of light, and recording the light variations on a light-sensitive blank as a graph of identical wave-forms.

8. The method of producing a sound-controlling record which includes causing light variations by scanning a primary pattern with a line of light and recording the light variations on a light-sensitive blank as a plurality of individual graphs of identical wave-forms representing tones of different pitch.

9. The method of producing a sound-controlling record which includes causing light variations by scanning a primary pattern with a line of light, and recording the light variations on a light-sensitive blank as a continuous graph of identical wave-forms.

10. The method of making a sound-controlling record which includes producing light variations by rotating a primary pattern relative to a scanning line of light, and utilizing the light variations to control the recording of a graph of identical wave-forms on a record blank.

11. The method of making a sound-controlling record which includes producing light variations by rotating a primary pattern relative to a scanning line of light, and utilizing the light variations to control the recording of a graph of identical wave-forms on a light-sensitive blank.

12. The method of producing a sound-controlling record which includes causing light variations by rotating a primary pattern relative to a scanning line of light, and recording the light variations on a light-sensitive blank as a graph of identical wave-forms.

13. The method of producing a sound-controlling record which includes effecting light variations by the relative movement between a scanning line of light and a primary pattern comprising a predetermined wave-form, and utilizing the light variations to control the recording of wave-forms on a record blank.

14. The method of making a sound-controlling record which includes producing light variations by the relative movement of a scanning line of light and a primary pattern comprising a predetermined wave-form, and utilizing the light variations to control the recording of wave-forms on a light-sensitive blank.

15. The method of making a sound-controlling record which includes producing light variations by the relative movement between a scanning line of light and a primary pattern comprising a predetermined wave-form, and recording the light variations on a light-sensitive blank.

16. The method of making a sound-controlling record which includes rotating a record blank relative to a source of light, producing light variations by scanning a primary pattern with a line of light, and utilizing the light variations to control the recording of a graph of identical wave-forms on said record blank.

17. The method of making a sound-controlling record which includes rotating a light-sensitive blank relative to a source of light, producing light variations by scanning a primary pattern with a line of light, and utilizing the light variations to record a graph of identical wave-forms on said light-sensitive blank.

18. The method of producing a sound-controlling record which comprises a series of graphs each representative of a musical tone, which includes moving a recording photographic blank in respect to a normally stationary light source, determining the form of the graphs by movement of a primary wave pattern of the said tone in respect to the path of light between the light source and photographic blank, shifting the path of exposure of the photographic blank at the completion of each graph to regulate the spacing of the different graphs and prevent overlapping thereof, and adjusting the relative rate of movement of the photographic blank and the primary wave pattern for each graph so that the resultant wave-forms of the respective graphs are substantially in the desired frequency relation.

19. The method of producing a sound-controlling record which includes effecting relative movement between a light-sensitive blank and a source of light, recording variations of light from said source on said blank, relating the frequency of the light variations to the speed of a synchronous motor, and relating the relative movement of the light-sensitive blank and the source of light to the speed of a second synchronous motor connected to the same source of alternating current as the first.

20. The method of making a sound-controlling record which includes causing light variations by scanning a primary pattern with a line of light, recording the light variations as a graph of wave-forms in a continuous path on said blank, and regulating the frequency of the light variations to shift the phase of the wave forms.

21. The method of making a sound controlling record which includes causing light variations by scanning a primary pattern with a line of light, recording the light variations as a graph of wave-forms in a continuous path and shifting the phase of the wave-forms during the recording process in order that the first and last wave-forms recorded in said path may be substantially in phase.

22. The method of making a sound-controlling record which includes scanning a primary pattern with a line of light effecting relative movement between a light-sensitive blank and the line of light, varying the light from said line in a non-uniform manner, recording the light variations on said blank as a continuous graph of wave-forms, and regulating the light-variations so that the first and last wave-forms recorded in said graph are substantially in phase.

23. The method of making a sound-controlling record which includes causing light variations by scanning a primary pattern with a line of light, recording the light variations as a graph of wave-forms in a continuous path and introducing a shift of phase in the wave-forms in said path.

24. The method of producing a sound-controlling record comprising a series of wave-form patterns representing respectively the notes of the tempered scale, including the steps of causing light variations by scanning a primary pattern with a line of light, recording the light variations as patterns of wave-forms and introducing at intervals in one or more of the patterns wave-forms of distorted wave-length.

25. The method of making a sound-controlling record which includes rotating a record blank relative to a recording device, causing light variations by scanning a primary pattern with a line of light and recording on said blank a plurality of wave-form patterns adapted to control the production of the twelve notes comprised within the tempered scale octave.

26. In apparatus for making a sound-controlling record, the combination of a record blank, a primary pattern, means for causing light variations by scanning said primary pattern with a line of light, and means for utilizing the light variations to control the recording of a graph of identical wave-forms on said record blank.

27. In apparatus for making a sound-controlling record, the combination of a record blank, a primary pattern, means for causing light variations by scanning said primary pattern with a line of light, and means for utilizing the light variations to control the recording of individual graphs of wave-forms on said blank representing tones of different pitch.

28. In apparatus for making a sound-controlling record, the combination of a record blank, a primary pattern, means for causing light variations by scanning said primary pattern with a line of light, and means for utilizing the light variations to control the recording on said blank of a continuous graph of identical wave-forms.

29. In apparatus for making a sound-controlling record the combination of a light-sensitive blank, a primary pattern, means for causing light variations by scanning said primary pattern with a line of light, and means for utilizing the light variations to control the recording of a graph of identical wave-forms on said light-sensitive blank.

30. In apparatus for making a sound-controlling record, the combination of a light-sensitive blank, a primary pattern, means for causing light variations by scanning said primary pattern with a line of light, and means for utilizing the light variations to control the recording of wave-forms on said light-sensitive blank as a plurality of graphs representing tones of different pitch.

31. In apparatus for making a sound-controlling record the combination of a light-sensitive blank, a primary pattern, means for causing light variations by scanning said primary pattern with a line of light, and means for utilizing the light variations to control the recording on said blank of a continuous graph of identical wave-forms.

32. In apparatus for making a sound-controlling record, the combination of a light-sensitive blank, a primary pattern, means for causing light variations by scanning said primary pattern with a line of light, and means for recording the light variations on said blank as a graph of identical wave-forms.

33. In apparatus for making a sound-controlling record, the combination of a light-sensitive blank, a primary pattern, means for causing light variations by scanning said primary pattern with a line of light, and means for recording the light variations on said blank as a plurality of individual graphs of identical wave-forms representing tones of different pitch.

34. In apparatus for making a sound-controlling record, the combination of a light-sensitive blank, a primary pattern, means for causing light variations by scanning said primary pattern with a line of light, and means for recording the light variations on said blank as a continuous graph of identical wave-forms.

35. In apparatus for making a sound-controlling record the combination of a record blank, a primary pattern, means for causing light variations by rotating said primary pattern relative to a scanning line of light, and means for utilizing the light variations to control the recording of a graph of identical wave-forms on said secord blank.

36. In apparatus for making a sound-controlling record the combination of a light-sensitive blank, a primary pattern, means for causing light variations by rotating said pattern relative to a scanning line of light, and means for utilizing the light variations to control the recording of a graph of identical wave-forms on said light-sensitive blank.

37. In apparatus for making a sound-controlling record the combination of a primary pattern, a light-sensitive blank, means for causing light variations by rotating said pattern relative to a scanning line of light, and means for recording the light variations on said light-sensitive blank as a graph of identical wave-forms.

38. In apparatus for making a sound-controlling record, the combination of a record blank, a primary pattern comprising a predetermined wave-form, means for causing light variations by scanning said pattern with a line of light, and means for utilizing the light variations to control the recording of wave-forms on said blank.

39. In apparatus for making a sound-controlling record the combination of a light-sensitive blank, a primary pattern comprising a predetermined wave-form, means for causing light variations by scanning said primary pattern with a line of light, and means for utilizing the light variations to control the recording of wave-forms on said light-sensitive blank.

40. In apparatus for making a sound-controlling record, the combination of a light-sensitive blank, a primary pattern comprising a predetermined wave-form, means for causing light variations by scanning said pattern with a line of light, and recording the light variations on said light-sensitive blank.

41. In apparatus for making a sound-controlling record, the combination of a record blank, a source of light, a primary pattern, means for rotating said blank relative to said source of light, means for causing light variations by scanning said pattern with a line of light, and means for utilizing the light variations to control the recording of a graph of identical wave-forms on said record blank.

42. In apparatus for making a sound-controlling record, the combination of a light-sensitive blank, a primary pattern, a source of light, means for causing light variations by scanning said pattern with a line of light, and means for utilizing the light variations to control the recording of a graph of identical wave-forms on said light-sensitive blank.

43. In apparatus for making a sound-controlling record, the combination of a recording photographic blank, a narrow elongated slot, a stationary light source, means for projecting light from said source through said slot onto said blank, means for effecting movement of the photographic blank in respect to the light source, a primary wave pattern, and means for controlling the effective length of said slot by movement of said pattern across the slot.

44. In apparatus for making a sound-controlling record, the combination of a recording photographic blank, a narrow elongated slot, a stationary light source, means for projecting light from said light source through said slot onto said blank, means for effecting rotation of the photographic blank in respect to the light source, a primary wave pattern, and means for controlling the effective length of the slot by movement of said pattern across the slot.

45. In apparatus for making a sound-controlling record, the combination of a recording photographic blank, a narrow elongated slot, a stationary light source, means for projecting light from said light source through said slot onto said blank, means for effecting rotation of the photographic blank in respect to the light source, a primary wave pattern, means for controlling the effective length of said slot by movement of said pattern across the slot, and means for focusing the light rays from the effective length of the slot onto the photographic blank.

46. In apparatus for making a sound-controlling record, the combination of a recording photographic blank, a stationary light source, a narrow elongated slot, means for projecting light from said light source through said slot onto said blank, means for effecting rotation of the photographic blank in respect to the light source, a primary wave pattern, and means for controlling the effective length of said slot by rotation of said pattern across the slot.

47. In apparatus for making a sound-controlling record comprising a series of graphs, each representing a musical tone, the combination of a recording photographic blank, a normally stationary light source, means for moving said blank in respect to said light source, a primary wave pattern of said tone, means for determining the form of the graphs by movement of said pattern in respect to the path of light between the light source and the photographic blank, means for shifting the path of exposure of the photographic blank at the completion of each graph to regulate the spacing of the different graphs and to prevent overlapping thereof, and means for adjusting the relative movement of the photographic blank and the primary wave pattern for each graph so that the resultant wave-forms of the respective graphs are substantially in the desired frequency relation.

48. In apparatus for making a sound-controlling record, the combination of a light-sensitive blank, a source of light, means for varying the light from said source, means for relating the frequency of the light variations to the speed of a synchronous motor, means for effecting relative movement between the light-sensitive blank and the source of light, means for relating the speed of relative movement of the light-sensitive blank and the source of light to the speed of a second synchronous motor, and means for recording the light variations on said light-sensitive blank.

49. In apparatus for making a sound-controlling record, the combination of a light-sensitive blank, a line of light, a primary pattern, means for effecting relative movement between said blank and said line of light, means for causing light variations by scanning said primary pattern with said line of light, means for recording the light variations as a graph of wave-forms in a continuous path on said blank, and means for regulating the frequency of the light variations to shift the phase of the wave-forms.

50. In apparatus for making a sound-controlling record, the combination of a record blank, a primary pattern, a line of light, means for causing light variations by scanning said primary pattern with said line of light, means for utilizing the light variations to control the recording of a graph of wave-forms in a continuous path on said blank, and means for shifting the phase of the wave-forms during the recording process in order that the first and last wave-forms recorded may be substantially in phase.

51. In apparatus for making a sound-controlling record, the combination of a record blank, a primary pattern, a line of light, means for causing light variations by scanning said primary pattern with said line of light, means for utilizing the light variations to control the recording wave-forms in a continuous path on said blank, and means for effecting a shift of phase in the wave-forms in said path.

52. In apparatus for making a sound-controlling record, comprising a series of wave-form patterns representing respectively the notes of the tempered scale, a record blank, a line of light, a primary pattern, means for causing light variations by scanning said primary pattern with said line of light, means for recording the light variations as a series of wave-form patterns on said blank, and means for introducing at intervals in one or more of the patterns wave-forms of distorted wave-length.

53. In apparatus for making a sound-controlling record, the combination of a record blank, a recording device, means for causing light variations by scanning a primary pattern with a line of light, means for utilizing the light variations to control the recording device, means for rotating said blank relative to said recording device, means for recording on said blank a plurality of wave-form patterns adapted to control the production of the twelve tones of the tempered scale octave, and means for regulating the recording so that the first and last wave-forms recorded are substantially in phase.

54. In apparatus for making a sound-controlling record, the combination of a record blank, means for recording wave-forms in a continuous path on said blank, and means including a differential gear for shifting the phase of the wave-forms.

ARTHUR COBB HARDY.